United States Patent
Chellam et al.

(10) Patent No.: US 11,809,692 B2
(45) Date of Patent: *Nov. 7, 2023

(54) ANALYZING AND LINKING A SET OF IMAGES BY IDENTIFYING OBJECTS IN EACH IMAGE TO DETERMINE A PRIMARY IMAGE AND A SECONDARY IMAGE

(71) Applicant: eBay Inc., San Jose, CA (US)

(72) Inventors: Nithya Chellam, Bengaluru (IN);
Rahul Kyamaji, San Jose, CA (US);
Sruthi Madapoosi Ravi, Chennai (IN);
Krithika Sairam, San Jose, CA (US);
Pranav Shekhar Jha, Kadugodi (IN)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/509,170

(22) Filed: Jul. 11, 2019

(65) Prior Publication Data
US 2020/0081959 A1 Mar. 12, 2020

Related U.S. Application Data

(63) Continuation of application No. 15/088,586, filed on Apr. 1, 2016, now Pat. No. 10,366,144.

(51) Int. Cl.
*G06F 3/04842* (2022.01)
*G06F 40/134* (2020.01)
(Continued)

(52) U.S. Cl.
CPC ........ *G06F 3/04842* (2013.01); *G06F 3/0482* (2013.01); *G06F 3/0485* (2013.01);
(Continued)

(58) Field of Classification Search
CPC .. G06F 40/134; G06F 3/0482; G06F 3/04842; G06F 3/0485; G06F 3/14;
(Continued)

(56) References Cited

U.S. PATENT DOCUMENTS

| | | | |
|---|---|---|---|
| 7,023,475 B2 | 4/2006 | Bean et al. | |
| 7,216,295 B2 | 5/2007 | Wu et al. | |

(Continued)

FOREIGN PATENT DOCUMENTS

| | | | |
|---|---|---|---|
| CN | 101164083 A | 4/2008 | |
| CN | 101753913 A | 6/2010 | |

(Continued)

OTHER PUBLICATIONS

U.S. Appl. No. 15/088,586 U.S. Pat. No. 10,366,144, filed Apr. 1, 2016, Analyzing and Linking a Set of Images by Identifying Objects in Each Image to Determine a Primary Image and a Secondary Image (as amended).

(Continued)

*Primary Examiner* — Thu V Huynh
(74) *Attorney, Agent, or Firm* — FIG. 1 Patents

(57) ABSTRACT

A set of images is accessed from a server. The set is analyzed to identify objects in each image using object recognition algorithms. A primary image that includes more of the identified objects than any of the other images of the set is determined. For each of the identified objects in the primary image, a secondary image that includes the identified object and has a higher magnification than the primary image is determined. Links are inserted into the primary image at locations including an identified object that is also in a secondary image. The primary image is displayed and, upon receiving a selection of one of the links, the secondary image that includes the identified object at the location of the selected link is displayed. The set of images is ordered based on relative positions of the identified objects in each image and then linked together based on the ordering.

18 Claims, 12 Drawing Sheets

(51) Int. Cl.
  *G06F 3/0482* (2013.01)
  *G06F 3/0485* (2022.01)
  *G06Q 30/0601* (2023.01)
  *G06F 18/00* (2023.01)
  *G06F 3/14* (2006.01)
(52) U.S. Cl.
  CPC ....... *G06F 40/134* (2020.01); *G06Q 30/0601* (2013.01); *G06F 3/14* (2013.01); *G06F 18/00* (2023.01); *G06F 2203/04806* (2013.01)
(58) Field of Classification Search
  CPC ........ G06F 2203/04806; G06K 9/6202; G06Q 30/0601; G06V 10/751
  USPC ....................................................... 715/205
  See application file for complete search history.

(56) References Cited

U.S. PATENT DOCUMENTS

| | | | |
|---|---|---|---|
| 7,716,157 B1* | 5/2010 | Bourdev | G06F 16/58 |
| 7,990,394 B2 | 8/2011 | Vincent et al. | |
| 8,264,504 B2 | 9/2012 | Naimark | |
| 8,487,957 B1 | 7/2013 | Bailly et al. | |
| 8,515,159 B2 | 8/2013 | Snavely et al. | |
| 8,542,245 B2 | 9/2013 | Kondo et al. | |
| 9,171,195 B1 | 10/2015 | Rybakov et al. | |
| 9,204,090 B2 | 12/2015 | Kim et al. | |
| 10,366,144 B2 | 7/2019 | Chellam | |
| 10,475,160 B1* | 11/2019 | Conroy | G06T 3/40 |
| 2002/0075311 A1* | 6/2002 | Orbanes | G06F 3/0481 715/764 |
| 2003/0103063 A1 | 6/2003 | Mojaver et al. | |
| 2004/0015778 A1* | 1/2004 | Britton | G06F 40/103 715/255 |
| 2004/0169684 A1* | 9/2004 | Orth | G06F 16/51 715/804 |
| 2006/0150099 A1* | 7/2006 | Laff | G06F 3/0481 715/708 |
| 2008/0089590 A1 | 4/2008 | Isomura et al. | |
| 2008/0267451 A1 | 10/2008 | Karazi | |
| 2008/0288855 A1* | 11/2008 | Issler | G06F 3/0483 715/205 |
| 2009/0148045 A1* | 6/2009 | Lee | G06Q 30/02 382/190 |
| 2010/0211602 A1 | 8/2010 | Menon et al. | |
| 2010/0295971 A1 | 11/2010 | Zhu | |
| 2011/0091065 A1 | 4/2011 | Chandrashekar et al. | |
| 2011/0105194 A1* | 5/2011 | Wang | G06F 16/5838 455/566 |
| 2011/0126138 A1* | 5/2011 | Kawai | G06F 3/04845 715/765 |
| 2011/0228120 A1 | 9/2011 | Inoue et al. | |
| 2011/0251903 A1* | 10/2011 | Ryu | G06Q 30/0623 705/14.73 |
| 2012/0002868 A1* | 1/2012 | Loui | G06K 9/00677 382/159 |
| 2012/0019545 A1 | 1/2012 | Nonaka | |
| 2012/0151398 A1* | 6/2012 | Foy | G06F 16/5866 715/810 |
| 2012/0281913 A1 | 11/2012 | Kutaragi et al. | |
| 2013/0022291 A1 | 1/2013 | Sumi | |
| 2013/0265467 A1 | 10/2013 | Matsuzawa et al. | |
| 2013/0282466 A1* | 10/2013 | Hampton | G06Q 30/0603 705/14.27 |
| 2014/0052549 A1* | 2/2014 | Dollens | G06Q 30/0623 705/14.73 |
| 2014/0180758 A1 | 6/2014 | Agarwal et al. | |
| 2014/0225925 A1* | 8/2014 | Hayashi | G09G 5/36 345/634 |
| 2015/0169177 A1* | 6/2015 | Zhao | G06F 16/583 715/838 |
| 2015/0199385 A1 | 7/2015 | Choi et al. | |
| 2015/0373414 A1 | 12/2015 | Kinoshita | |
| 2016/0070438 A1* | 3/2016 | Kim | G06F 3/04817 715/846 |
| 2016/0110902 A1 | 4/2016 | Chirakansakcharoen et al. | |
| 2017/0091584 A1* | 3/2017 | Bhat | G06K 9/6218 |
| 2017/0286372 A1 | 10/2017 | Chellam et al. | |

FOREIGN PATENT DOCUMENTS

| | | |
|---|---|---|
| CN | 102017661 A | 4/2011 |
| CN | 102222079 A | 10/2011 |
| CN | 102640098 A | 8/2012 |
| CN | 102668585 A | 9/2012 |
| CN | 102812452 A | 12/2012 |
| CN | 103733177 A | 4/2014 |
| CN | 103827924 A | 5/2014 |
| CN | 104919452 A | 9/2015 |
| CN | 105005982 A | 10/2015 |
| CN | 105045793 A | 11/2015 |
| CN | 105339953 A | 2/2016 |
| CN | 108885702 A | 11/2018 |
| JP | 2011244343 A | 12/2011 |
| KR | 10-2006-0053763 A | 5/2006 |
| KR | 101320014 B1 | 10/2013 |
| WO | 2017/172905 A1 | 10/2017 |

OTHER PUBLICATIONS

Extended European Search Report received for European Patent Application No. 17776542.7, dated Nov. 5, 2019, 8 pages.
Office Action received for Korean Patent Application No. 10-2018-7031708, dated Apr. 9, 2020, 13 pages (7 pages of Official Copy and 6 pages of English Translation).
Response to Extended European Search Report filed on May 6, 2020, for European Patent Application No. 17776542.7, dated Nov. 5, 2019, 14 Pages.
"Google Street View", Retrieved from the Internet URL: <https://ggstreetview.com/>, May 25, 2007, 2 pages.
Amendment filed on Oct. 31, 2018, for Korean Patent Application No. 10-2018-7031708, 34 pages (4 pages official copy and 34 pages English translation).
Applicant Initiated Interview Summary received for U.S. Appl. No. 15/088,586, dated Aug. 21, 2017, 4 pages.
First Action Interview—Office Action Summary received for U.S. Appl. No. 15/088,586, dated Jun. 16, 2017, 4 pages.
Notice of Allowance received for U.S. Appl. No. 15/088,586, dated Mar. 20, 2019, 7 pages.
Notice of Allowance received for U.S. Appl. No. 15/088,586, dated Jul. 6, 2018, 9 pages.
Office Action-First Interview Summary received for U.S. Appl. No. 15/088,586, dated Nov. 2, 2017, 10 pages.
Response to First Action Interview—Office Action Summary filed on Jan. 29, 2018, for U.S. Appl. No. 15/088,586, dated Nov. 2, 2017, 21 pages.
Response to First Action Interview—Office Action Summary filed on Jul. 17, 2017, for U.S. Appl. No. 15/088,586, dated Jun. 16, 2017, 5 pages.
Supplemental Notice of Allowance received for U.S. Appl. No. 15/088,586, dated Jul. 19, 2018, 5 pages.
International Preliminary Report on Patentability received for PCT Patent Application No. PCT/US2017/024734, dated Oct. 11, 2018, 7 pages.
International Search Report received for PCT Application No. PCT/US2017/024734, dated Jun. 19, 2017, 2 pages.
International Written Opinion received for PCT Application No. PCT/US2017/024734, dated Jun. 19, 2017, 5 pages.
Response to Office Action filed on Jun. 8, 2020 for Chinese Patent Application No. 10-2018-7031708, dated Apr. 9, 2020, 29 pages (24 pages of Official Copy & 5 pages of English Translation of Claims).
Communication Pursuant to Article 94(3) EPC received for European Patent Application No. 17776542.7 dated Feb. 22, 2021, 8 Pages.
Office Action received for Chinese Patent Application No. 201780021254.3, dated Nov. 18, 2021, 10 pages (1 page of English translation and 9 pages of official copy).

(56) References Cited

OTHER PUBLICATIONS 201780021254.3, "Notice of decision to grant received for Chinese Patent Application No. 201780021254.3, dated Nov. 21, 2022", dated Nov. 21, 2022, 4 Pages.

201780021254.3, "Office Action received for Chinese Patent Application No. 201780021254.3, dated Aug. 19, 2022", dated Aug. 19, 2022, 7 Pages.

\* cited by examiner

US 11,809,692 B2

ANALYZING AND LINKING A SET OF IMAGES BY IDENTIFYING OBJECTS IN EACH IMAGE TO DETERMINE A PRIMARY IMAGE AND A SECONDARY IMAGE

CROSS REFERENCE TO RELATED APPLICATIONS

This application is a continuation of and claims the benefit of priority to U.S. application Ser. No. 15/088,586, filed Apr. 1, 2016, the contents of which is hereby incorporated by reference in its entirety.

FIELD

The present disclosure relates generally to image analysis and processing, and in a specific example embodiment, to performing object recognition on a set of images in order to identify a main image from the set of images and to generate links between the images of the set based on the recognized objects in each of the images of the set.

BACKGROUND

Conventionally, when a viewer browses a collection of images, such as images for a product listing on an electronic commerce (e-commerce) website or images for a location at a travel destination website, the experience is not orchestrated ahead of time for the benefit of the viewer. For example, a set of images provided by a user for a website may be presented to the viewer with no indication of which image of the set of images is most informative (e.g., shows most aspects of the product or location) or if any of the images of the set should be viewed before or after another of the image of the set (e.g., should the images be viewed in an ordered manner). However, the viewer that is in a rush may desire information regarding which user provided images show the most crucial part of a product listing or central part of a destination location. Furthermore, a viewer looking for a more intuitive viewing experience may want to understand how the set of images associated with a product listing or destination location relate to each other in order to view the images of the set in a preferred order. In some cases, the viewer browsing product listings on an e-commerce website or locations at a travel destination website may be discouraged from purchasing or traveling simply because of the confusing viewer experience in navigating the associated images due to a lack of any meaningful ordering of the images.

BRIEF DESCRIPTION OF DRAWINGS

Various ones of the appended drawings merely illustrate example embodiments of the present invention and cannot be considered as limiting its scope.

Figure 1:
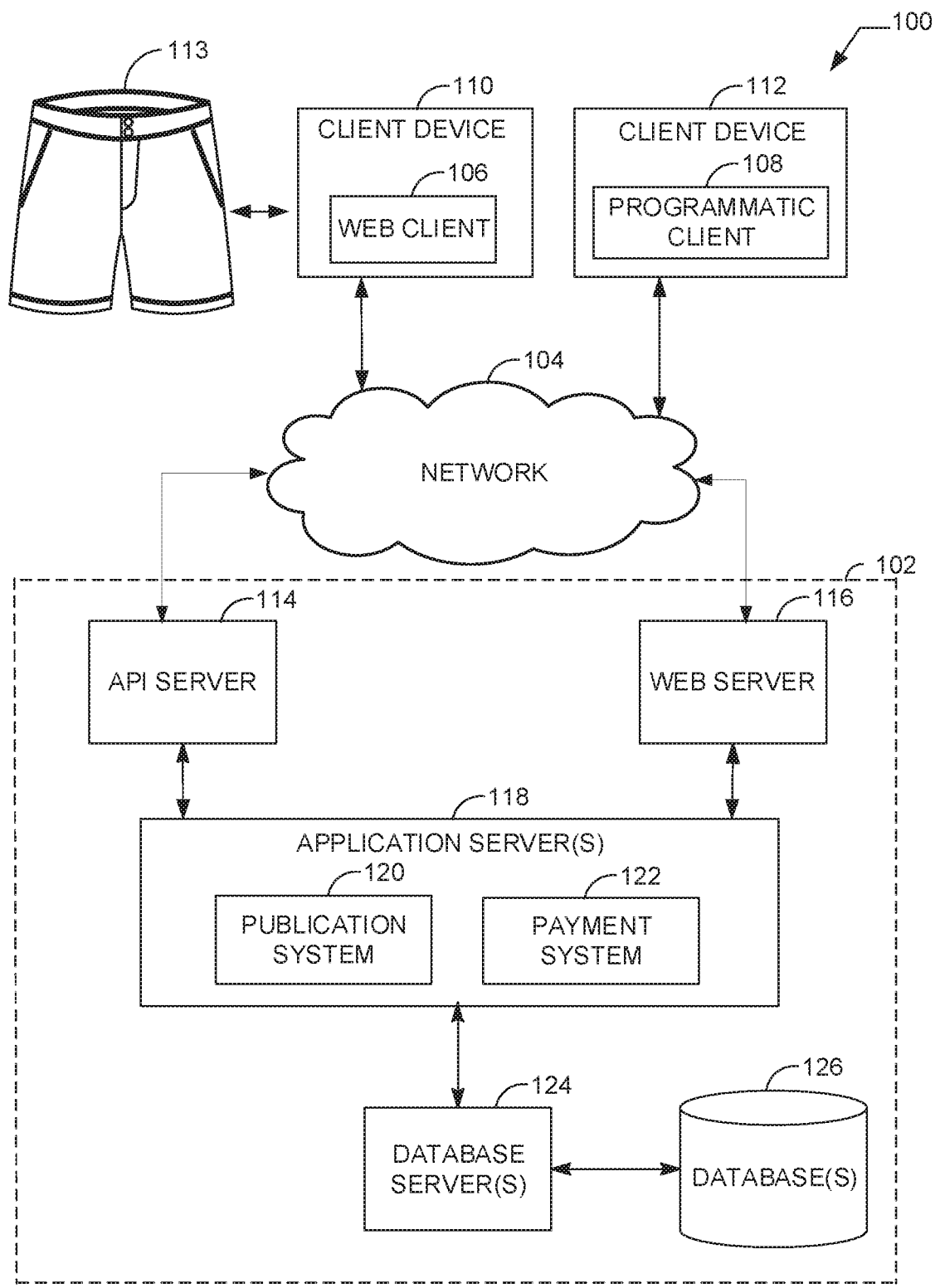
FIG. 1 is a block diagram illustrating an example embodiment of a network architecture of a system for publishing a set of interrelated electronic images.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Example embodiments described herein provide systems and methods for analyzing a set of electronic images, such as seller uploaded images for a product listing at an e-commerce website, to create an orchestrated image navigation experience for a viewer who views the product listing. The set of images (e.g., for the product listing) is analyzed to identify objects in each image using object recognition algorithms, such as color contour matching or template matching. The selection of the object recognition algorithms can be based, for example, on data associated with the image, such as a category of the product at the e-commerce website. A primary image (e.g., most informative or helpful) of the set is determined based on identifying the image of the set that includes more of the identified objects than any of the other images of the set. For each of the identified objects in the primary image, a secondary image of the set is determined that: includes the identified object and has a higher magnification than the primary image (e.g., zoomed in on the identified object). A link to each such secondary image can then be inserted into the primary image at the location in the primary image that includes the identified object that is also in the respective secondary image. The primary image can then be presented to the viewer as the initial image upon viewing a corresponding product listing, location description or other set of published electronic images. If the viewer selects (e.g., clicks on) one of the links (e.g., which are highlighted in the primary image) then the corresponding secondary image that includes the identified object at the location of the selected link is displayed.

Each of the images in the set of images can also be analyzed to determine the relative location of at least one identified object in the image with respect to the location of the same at least one identified object in each of the other images of the set. An order for navigating the set of images (e.g., starting with the primary image) can then be determined based on the relative location of the at least one identified object in each of the images, for example, to obtain a 360° view of a product or location. In order to implement the ordered navigation of the images a link to the next image in the order can be inserted into each image of the set at a right edge of the image and a link to the previous image in the order can be inserted into each image of the set at a left edge of the image. The last image in the order can include a link at the right edge of the image (e.g., an exit link) that returns the viewer's view to the primary image.

In an embodiment, if it is determined that no image of the set includes more of the identified objects than any of the other images of the set and all images of the set are of equivalent size, a primary image for the set may be generated. For example, if the number of images in the set of images is 6, then the size of each of the images of the set can be reduced by a factor equal to the total number of images in the set, e.g., reduce size of each image to ⅙ of the original size of the image. A conglomerate image can then be generated by including each of the images with reduced size in one image which is then used as the primary image for the set. As noted above, links can then be inserted into the conglomerate image at the locations in the conglomerate image that include one of the images with reduced size and selection of such a link by the viewer will result in the full size image of the set that corresponds to the image with reduced size at the location of the selected link.

In an embodiment, if it is determined that no other image of the set: includes an identified object in the primary image and has a higher magnification than the primary image, then a database of stored images (e.g., a database associated with a website) can be searched to identify a stored image that: includes the identified object and has a higher magnification than the primary image. This identified image from the database can then be used as a corresponding secondary image for the identified object in the primary image. As noted above, a link to this identified image from the database can then be inserted into the primary image at the location in the primary image that includes the identified object that is also in the identified image from the database.

FIG. 1 is a block diagram illustrating an example embodiment of a network architecture 100 of a system for publishing a set of interrelated electronic images. A networked system 102, in an example form of a network-server-side functionality, is coupled via a communication network 104 (e.g., the Internet, wireless network, cellular network, or a Wide Area Network (WAN)) to one or more client devices 110 and 112. FIG. 1 illustrates, for example, a web client 106 operating via a browser (e.g., such as the INTERNET EXPLORER® MICROSOFT EDGE® browsers developed by Microsoft® Corporation of Redmond, Wash. State), and a programmatic client 108 executing on respective client devices 110 and 112.

The client devices 110 and 112 may comprise a mobile phone, desktop computer, laptop, or any other communication device that a user may utilize to access the networked system 102. In embodiments, the client device 110 may comprise or be connectable to an image capture device that is used to capture images, e.g., in the form of an image of a pair of shorts 113 for creating or enhancing a product listing. In further embodiments, the client device 110 may comprise one or more of a projector, touch screen, accelerometer, microphone, and GPS device. The client devices 110 and 112 may each be a device of an individual viewer or publisher interested in viewing or posting electronic images, e.g., images associated with a listing for a specific product sold via the networked system 102.

An Application Program Interface (API) server 114 and a web server 116 are coupled to, and provide programmatic and web interfaces respectively to, one or more application servers 118. The application servers 118 host a publication system 120 and a payment system 122, each of which may comprise one or more modules, applications, or engines, and each of which may be embodied as hardware, software, firmware, or any combination thereof. The application servers 118 are, in turn, coupled to one or more database servers 124 facilitating access to one or more information storage repositories or database(s) 126. The database(s) 126 may also store user account information of the networked system 102 in accordance with example embodiments.

In example embodiments, the publication system 120 publishes content on a network (e.g., Internet). As such, the publication system 120 provides a number of publication functions and services to users that access the networked system 102. The publication system 120 is discussed in more detail in connection with FIG. 2. In example embodiments, the publication system 120 is discussed in terms of a marketplace environment. However, it is noted that the publication system 120 may be associated with a non-marketplace environment such as an informational or social networking environment. Furthermore, in the context of the present disclosure the publication system 120 may receive images and information regarding the images and then publish the images and information for viewing by client devices 110 and 112. For example, in a corresponding product listing that is created or updated as needed. An image processing module (described below) of the publication system 120 (or connected to the publication system 120) may then analyze the published images, insert links between the images and update the published images to create an enhanced navigation experience for a viewer browsing the images.

The payment system 122 provides a number of payment services and functions to users. The payment system 122 allows users to accumulate value (e.g., in a commercial currency, such as the U.S. dollar, or a proprietary currency, such as "points") in their accounts, and then later to redeem the accumulated value for products (e.g., goods or services) that are made available via the publication system 120 or elsewhere on the network 104. The payment system 122 also facilitates payments from a payment mechanism (e.g., a bank account, PayPal™, or credit card) for purchases of products via any type and form of a network-based marketplace. For example, in the context of the present disclosure the payment system 122 may facilitate payment via a client device 110 or 112 for a product corresponding to a viewed product listing with an enhanced image navigation experience or for a vacation to a location described in the context of an enhanced image navigation experience.

While the publication system 120 and the payment system 122 are shown in FIG. 1 to both form part of the networked system 102, it will be appreciated that, in alternative embodiments, the payment system 122 may form part of a payment service that is separate and distinct from the networked system 102. Additionally, while the example network architecture 100 of FIG. 1 employs client-server architecture, a skilled artisan will recognize that the present disclosure is not limited to such architecture. The example network architecture 100 can equally well find application in, for example, a distributed or peer-to-peer architecture system. The publication system 120 and payment system 122 may also be implemented as standalone systems or standalone software programs operating under separate hardware platforms, which do not necessarily have networking capabilities.

Figure 2:
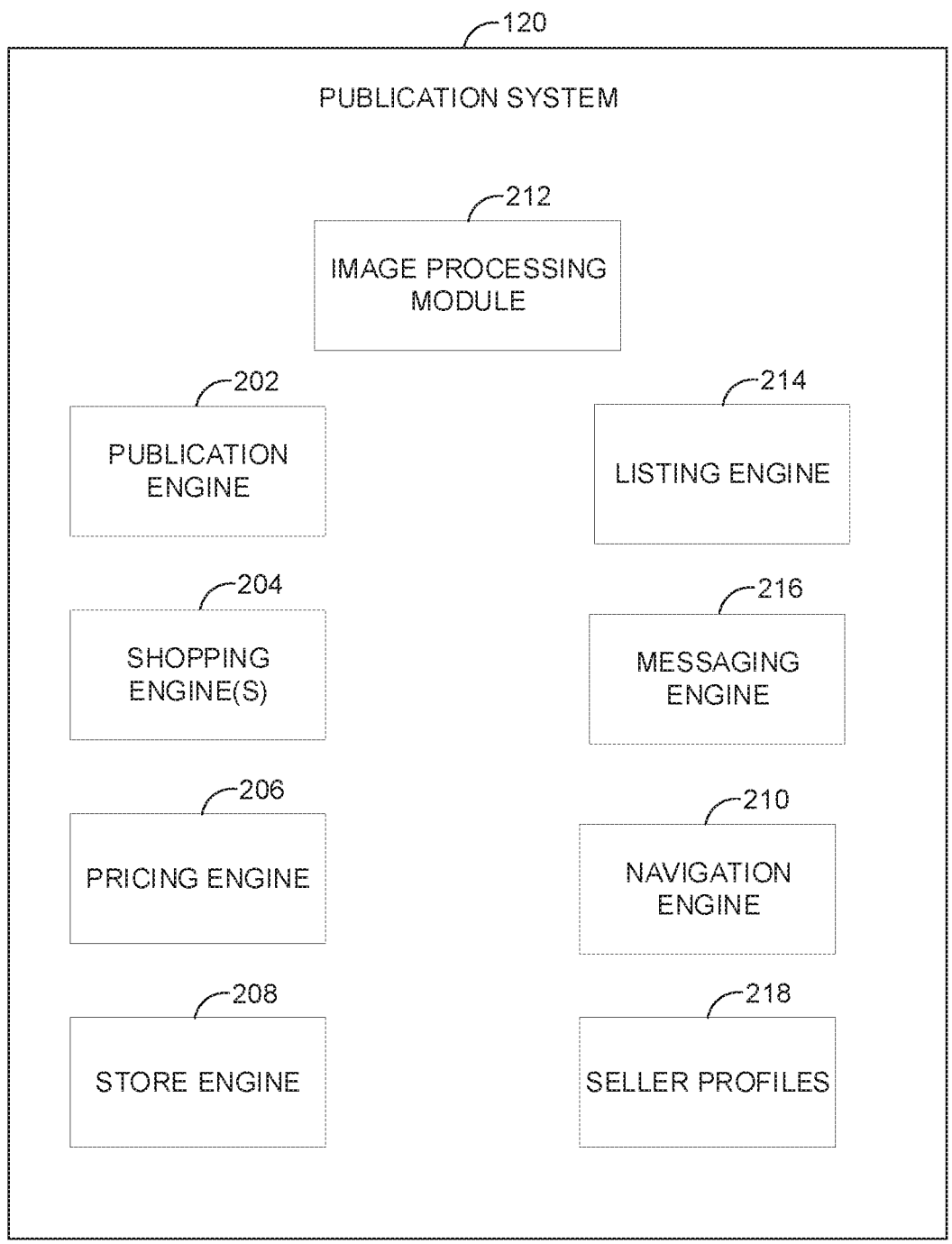
FIG. 2 is a block diagram illustrating multiple components that, in one embodiment, are provided within a publication system.

FIG. 2 is a block diagram illustrating multiple components that, in one embodiment, are provided within a publication system 120. In one embodiment, the publication system 120 is a marketplace system where items (e.g., products) may be offered for sale, e.g., via a client device 110 or 112. The publication system 120 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources, to allow information to be passed between the components or to allow the components to share and access common data. Furthermore, the components may access the one or more databases 126 (such as a cross-platform document-oriented database, e.g., a Mongo DB to store images for product listings) via the one or more database servers 124.

In one embodiment, the publication system 120 provides a number of publishing, listing, and price-setting mechanisms whereby a user may publish electronic images (or other information) concerning goods or services for sale or concerning non-commercial activities (e.g., provide images and information that may analyzed and interlinked), a viewer can express interest in or indicate a desire to purchase such goods or services or learn more about the non-commercial activities (e.g., via a selection made using a client device 110 or 112), and, in the case of good and services, a price can be set for a transaction pertaining to the goods or services. To this end, the publication system 120 may comprise at least one publication engine 202 and one or more shopping engines 204.

A pricing engine 206 supports various price listing formats such as a fixed-price listing format (e.g., the traditional classified advertisement-type listing or a catalog listing). A store engine 208 allows a seller (e.g., vendor) to group listings within a "virtual" store, which may be branded and otherwise personalized by and for the seller for presentation to a viewer via a client device 110 or 112. Such a virtual store may also offer promotions, incentives, and features that are specific and personalized to the seller.

Navigation of the publication system 120 may be facilitated by a navigation engine 210. For example, a search module (not shown) of the navigation engine 210 enables, for example, keyword searches of vendors, listings or other information published via the publication system 120. In a further example, a browse module (not shown) of the navigation engine 210 allows users to browse various category, catalog, or data structures according to which listings or other information may be classified within the publication system 120. Various other navigation applications within the navigation engine 210 may be provided to supplement the searching and browsing applications. In one embodiment, the navigation engine 210 allows the user to search or browse for items in the publication system 120 (e.g., virtual stores, listings in a fixed-price or auction selling environment, listings in a social network or information system). In alternative embodiments, the navigation engine 210 may navigate (e.g., conduct a search on) a network at large (e.g., network 104).

A listing engine 214 manages listings on the publication system 120. In example embodiments, the listing engine 214 allows users (e.g., sellers) to author listings of products for sale. The listing may comprise an image of an item along with a description of the item. In one embodiment, the listings pertain to goods or services that a user (e.g., a seller) wishes to transact via the publication system 120. As such, the listing may comprise an image of a good for sale and a description of the item such as, for example, dimensions, color, and, identifier (e.g., UPC code or ISBN code). In some embodiments, a user may create a listing that is an advertisement or other form of publication to the networked system 102. The listing engine 214 also allows the users to manage such listings by providing various management features (e.g., auto-relisting, inventory level monitors, etc.).

In order to make listings (or postings of information) that are available via the networked system 102 as visually informing and attractive as possible, in an embodiment, the publication system 120 includes an image processing module 212 that enables users to upload images, including 3D images, for inclusion within listings. In some embodiments, the image processing module 212 also receives image data from users and utilizes the image data to generate an enhanced image viewing experience by interlinking the images for an orchestrated viewer interaction with the images. For example, the image processing module 212 may receive an image and related information from seller (e.g., image 113 received via client device 110 is for listing a pair of shorts for sale) and perform an object recognition analysis of the image based on the "clothing" category of the product listing. Furthermore, the image processing module 212 may receive other seller data from the seller profiles 218, which may also be stored in database(s) 126. The image processing module 212 can analyze the recognized objects in the image(s) in order to link the images for an enhanced viewer navigation experience as will be discussed in more detail below with respect to FIG. 3.

A messaging engine 216 is responsible for the generation and delivery of messages to users of the networked system 102. Such messages include, for example, advising users regarding the status of listings and purchases (e.g., providing an acceptance notice to a buyer) or providing recommendations. Such messages may also include, for example, advising a seller of a sale (e.g., based on an enhanced product listing) to a user of a client device 110 or 112 and also advising of the location the user so that the product may be delivered to the user. The messaging engine 216 may utilize any one of a number of message delivery networks and platforms to deliver messages to users. For example, the messaging engine 222 may deliver electronic mail (e-mail), an instant message (IM), a Short Message Service (SMS), text, facsimile, or voice (e.g., Voice over IP (VoIP)) messages via wired networks (e.g., the Internet), a Plain Old Telephone Service (POTS) network, or wireless networks (e.g., mobile, cellular, WiFi, WiMAX, etc.).

Although the various components of the publication system 120 have been defined in terms of a variety of individual modules and engines, a skilled artisan will recognize that many of the items can be combined or organized in other ways. Alternatively, not all components of the publication system 120 of FIG. 2 may be utilized. Furthermore, not all components of the marketplace system 120 have been included in FIG. 2. In general, components, protocols, structures, and techniques not directly related to functions of exemplary embodiments (e.g., dispute resolution engine, loyalty promotion engine, personalization engines, etc.) have not been shown or discussed in detail. The description given herein simply provides a variety of exemplary embodiments to aid the reader in an understanding of the systems and methods used herein.

Figure 3:
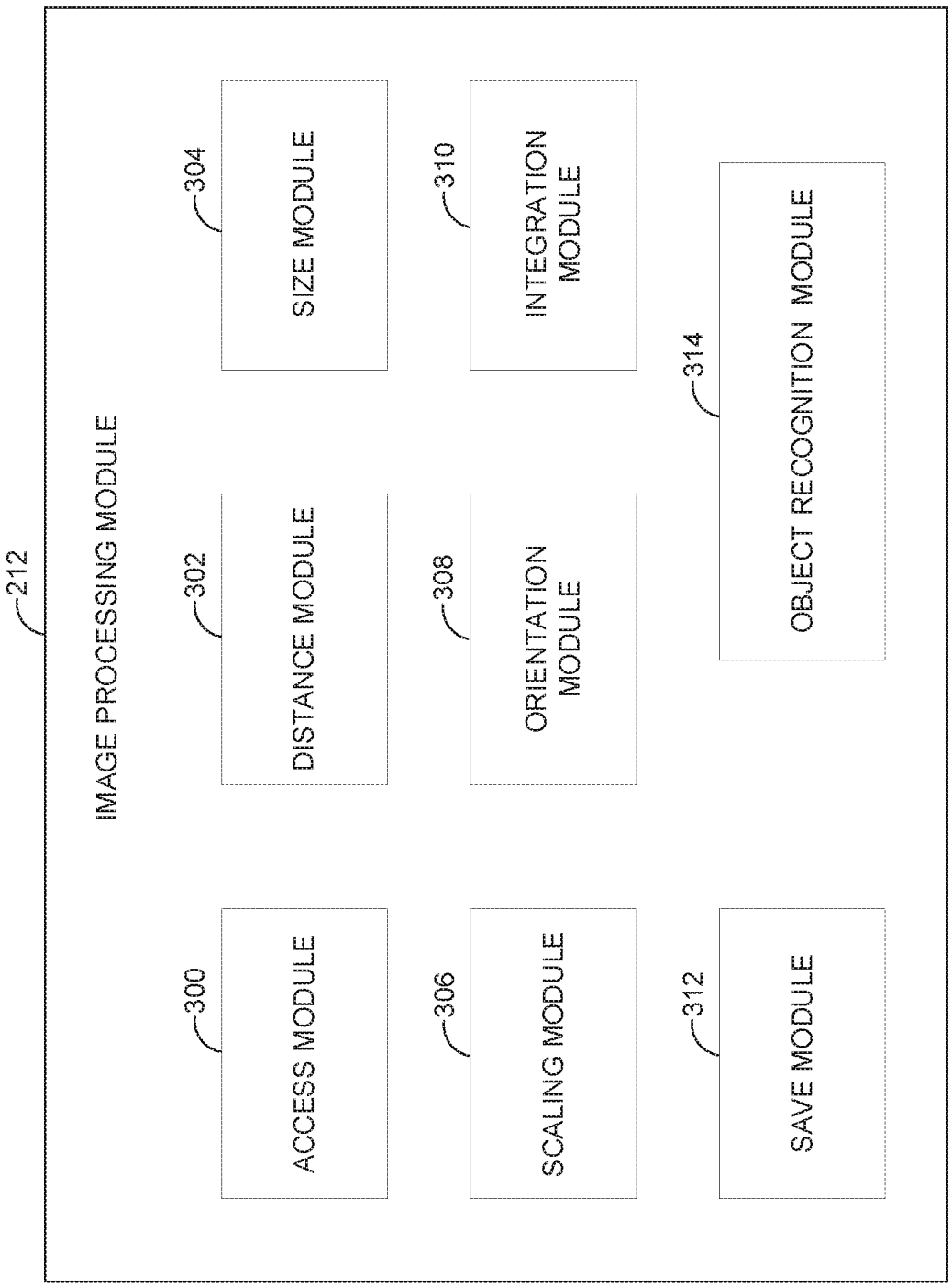
FIG. 3 is a block diagram illustrating multiple components that, in one embodiment, are provided within an image processing module.

FIG. 3 is a block diagram illustrating multiple components that, in one embodiment, are provided within an image processing module 212. In example embodiments, the image processing module 212 comprises an access module 300, a distance module 302, a size module 304, a scaling module 306, an orientation module 308, an integration module 310, a recommendation module 312, a save module 312, and an object recognition module 314. In alternative embodiments, functions of one or more of the modules of the image processing module 212 may be combined together, one or more of the modules may be removed from the image processing module 212, or one or more of the modules may be located elsewhere in the networked system 102 (e.g., in the listing engine 214) or at a client device 110 or 112.

In example embodiments, the image processing module 212 may access a set of images uploaded by a user of networked system 102 for publication via publication system 120 for analysis and interlinking of the uploaded images. The procedure for analyzing and interlinking the uploaded images can be event driven. For example, a seller can provide a set of images using client device 110 to create a product listing via listing engine 214 of publication system 120. The set of images may then be provided to publication engine 202 and one or more shopping engines 204 for creating and/or updating a product listing. When such a product listing is created or revised an event "ITEM.NEW" or "ITEM.REVISED" can be inserted (e.g., by publication engine 202) into an event stream for registered event consumers such as image processing module 212. The image processing module 212 can access an "Item Id" from the event "ITEM.NEW" or "ITEM.REVISED" and call a specific application programming interface "GetSingleItem API" to get address data for each of the images of the set of images, e.g., image uniform resource locators "URLs". The image processing module 212 can retrieve and store the set of images and related information (e.g., UPC code or ISBN code) in a database 126 (e.g., using save module 312 described below) before proceeding to visually analyze the set of images. The set of images can be included in a published product listing before they are analyzed so that the seller does not have to wait for the image analysis to be completed before the product listing is published by publication system 120. This may be necessary because, depending on the amount of images in the set and the amount of analysis needed, the wait time before publication of the product listing may become frustrating to the seller.

In an embodiment, the set of electronic images related information is accessed by the image processing module 212 form the database 126. The set of images is analyzed (e.g., using object recognition module 314 described below) to identify objects in each image using object recognition algorithms, such as color contour matching or template matching. The selection of the object recognition algorithms to be used for a particular image or set of images can be based, for example, on data associated with at least one of the images of the set, such as data provided by the user that originally provides the electronic images. For example the selection of the object recognition algorithms can be based on a universal product "UPC" code provided by a user for a product listing, so that images associated with a clothing product could be analyzed with a color contour matching algorithm (since specific features within the contours may not be necessary for identification) while a piece of complex machinery could be analyzed using a template matching algorithm (since specific elements of the machine may need to be matched to a template for identification). A primary image (e.g., most informative or helpful) of the set is determined based on identifying the image of the set that includes more of the objects identified using the object recognition algorithms than any of the other images of the set.

For each of the identified objects in the primary image, a secondary image of the set is determined that: includes the identified object and has a higher magnification than the primary image (e.g., zoomed in on the identified object). The size module 304 can be used to determine the relative magnification of an object identified in separate images (e.g., the primary image and a secondary image). A link to each such secondary image can then be inserted into the primary image (e.g., using the integration module 310 described below) at the location in the primary image that includes the identified object that is also in the respective secondary image. The image processing module 212 can then save, using the save module 312 described below, the enhanced set of images including the links to a database 126. The images can be saved with a flag to indicate that the images should be published together with the linking information that describes the relationship between the images for the purpose of an orchestrated navigation of the images by a viewer. The primary image can then be presented to the viewer as the initial image upon viewing the corresponding set of published electronic images, such as images for a product listing at an e-commerce website. If the viewer selects (e.g., clicks on) one of the links (e.g., which are highlighted in the primary image) then the corresponding secondary image that includes the identified object at the location of the selected link is displayed.

In an embodiment, the object recognition module 314 allows the image processing module 212 find and identify objects in an image of the set of images. A multitude of objects in images can be recognized despite the fact that the image of the objects may vary somewhat because of being shown from different viewpoints, in many different sizes and scales, or even translated or rotated. Objects can even be recognized when they are partially obstructed from view by other objects. In one embodiment, the object recognition module 314 uses example images (called templates or exemplars) of the objects to perform recognition. The templates could correspond, for example, to elements of a larger object that is recognized based on recognition of the elements. One template matching strategy could include: detecting edges in a template and an image, comparing the edges in the image to edges of the template and determining if there is a match. In another embodiment, the object recognition module 314 performs color contour matching. This strategy has the advantage of being resilient with respect to illumination changes, however much of the non-contour object information is lost, although this is not a problem in some cases, such as for recognizing clothing since recognition of specific features within the contour is not necessary to recognize a pair of shorts or a shirt.

In an embodiment, the size module 304 simply determines the relative size of a same identified object in two images in order to determine a relative magnification level between the images. In another embodiment, the size module 304 can use a marker (an identified object with known standard dimensions) in an image to calculate the relative sizes of other identified objects in the image. For example, if a door is shown in the image, the size module 304 may assume that the door is a standard sized door (e.g., 36"×80") or that a door knob is located at 36" from the floor. Using these known standard dimensions, the size for other identified objects in an image may be determined and the relative magnification of two similar images including the marker and another same identified object can also be determined.

In an embodiment, the integration module 310 places links in an image to other images of the set of images at determined locations, such as at the location of an identified object in the primary image. For example, the link may be integrated into the primary image and may also be highlighted so as to be easily visible to a browsing viewer. Selection of the link by the viewer will bring up a corresponding secondary image with a higher magnification of the identified object at the location of the integrated link in the primary image. The links may also be integrated into the right side edge or left side edge of an image in order to cycle through the set of images in a pre-arranged manner that is intuitive to the viewer as explained more fully below.

In an embodiment, each of the images in the set of images can also be analyzed by the image processing module 212 to determine the relative location of at least one identified object in the image with respect to the location of the same at least one identified object in each of the other images of the set. This analysis may be performed using the distance module 302 and orientation module 308 described below. For example, based on the distances between an identified object and the edges of an image and the orientation (e.g., facing) of the object in the image based on aspects such as which parts of the object are visible in the image. A specified order for navigating the set of images (e.g., starting with the primary image) can then be determined based on the relative location of the at least one identified object in each of the images, for example, to obtain a 360° view of an object recognized in the set of images. In order to implement the ordered navigation of the images a link to the next image in the order can be integrated into each image of the set (as described above with respect to integration module 310) at a right edge of the image and a link to the previous image in the order can be inserted into each image of the set at a left edge of the image. The last image in the order can include a link at the right edge of the image (e.g., an exit link) that returns the viewer to the primary image. Alternatively using left clicks and right clicks of a mouse while hovering the mouse pointer over an image can be used in place of the integrated links at the edges of each image.

In an embodiment, the distance module 302 determines the distances between two or more identified objects, between identified objects and the edges of an image and/or between identified objects and a focal point in an image. The focal point may be an area (e.g., the center of the image) of an image that draws the eye of a viewer and therefore the distance of an identified object form such a focal point can be important in determine how well the image shows the identified object. For example, if two images of a set of images show an equal amount of recognized, the one that best presents the identified objects (e.g., and should be selected as the primary image) may be determined based on measuring the proximity of the identified objects to the focal point in each of the images.

In an embodiment, the orientation module 308 determines the relative orientation of each identified object in an image so that it may be determined if the identified object is being viewed form the top, bottom, front, back, right or left side. For example, the shape of a same identified object in several images can be compared and the relative position of the identified objects in the same image (e.g., which is in front, behind or to the side of the other) can also be determined. This information, together with the distance information from distance module 302, can be used to determine which image is showing the top, bottom, front, back, right or left side of an object recognized in the set of images.

In an embodiment, if the image processing module 212 determines that no image of the set of images includes more of the identified objects than any of the other images of the set and the images are all approximately the same size (which is typical for images in a product listing), a primary image for the set of images may be generated using the scaling module 306 described below. For example, the size of each of the images of the set can be reduced (e.g., scaled) by a factor equal to the total number of images in the set, e.g., reduce size of each image to 1/(number of images) of the original size of the image. A conglomerate image can then be generated by the image processing module 212 by joining each of the scaled images into one image which is then used as the primary image for the set. As noted above, links can then be inserted into the conglomerate image by the integration module 310 at the locations in the conglomerate image that include one of the scaled images and selection of such a link by the viewer will result in the original full size image of the set of images that corresponds to the scaled image at the location of the selected link in the conglomerate image.

In an embodiment, the scaling module 306 scales images (e.g., reduces their size) of the same size so that they can be joined together in order to create a primary image of the same size as the other images in the set. Accordingly, the scaling module 306 may process the image set, as described above, in order to reduce the size of each image of the set of images by a factor equal to the total number of images in the set. In this way, the scaling module 306 reduces size of each image to 1/(number of images) of the original size of the image so that joining together the number of images results in a conglomerate image that is of size: (number of images)*1/(number of images)=1, that can be used as the primary image for the set of images.

In an embodiment, if the image processing module 212 determines that no other image of the set: includes an identified object in the primary image and has a higher magnification than the primary image, then a database of stored images (e.g., a database 126) can be searched, using access module 300 described below, to identify a stored image that: includes the identified object and has a higher magnification than the primary image. This identified image from the database 126 can then be added to the set of images and used as a corresponding secondary image for the identified object in the primary image. As noted above, a link to this identified image from the database can then be inserted into the primary image by integration module 310 at the location in the primary image that includes the identified object that is also in the identified image from the database 126.

In an embodiment, the access module 300 accesses images and related image data from database(s) 126, e.g., via database servers 124. In some embodiments, the access module 300 can accept input from a user (e.g., UPC code) via the client device 110 or 112 regarding an electronic image to be published (e.g., in a product listing). The access module 300 may then access a catalog of images (e.g., stored in the database(s) 126) based on the user input. Furthermore, the image may be provided by the user via client device 110 or 112 in response to a message sent by access module 300 to the user via messaging engine 216 of publication system 120.

The save module 312 saves electronic image files for later use, e.g., for future publication. In one embodiment, the set of images may be stored to the database 126 of the networked environment 102 with a flag to indicate they belong to a set of interlinked images to be published together with corresponding linking information describing an arranged navigation between the images. For example, the interlinked set of images can be stored using a JavaScript Object Notation "JSON" representation, in which each image object is defined as an imageURL: address for the current image object, a leftURL: address for the image to show upon clicking for a left side navigation from the current image object, a rightUR: address for the image to show upon clicking for a right side navigation from the current image object, clusters: indicating the clickable areas (e.g., integrated links) on the current image object and the image object reference for each such area, and an exitURL: address for the image to show upon clicking to exit navigation. An example JSON representation for an image object "ImageObj1" could be:

```
{
  "ImageObj1": {
    "name": null,
    "imageURL":
"http://i.ebayimg.com/00/s/MTAzN1gxNTA5/z/948AAOSwyQtVn-
wQ/$__12.JPG?set__id=880000500F",
    "leftURL": null,
    "rightURL": null,
    "clusters": [
      {
        "box": {
          "x1": 0.404,
          "x2": 0.586,
          "y1": 0.6802326,
          "y2": 0.9563953
        },
        "imageURL": "ImageObj14"
      },
      {
        "box": {
          "x1": 0.212,
          "x2": 0.396,
          "y1": 0.6802326,
          "y2": 0.95348835
        },
        "imageURL": "ImageObj13"
      },
      {
        "box": {
          "x1": 0.018,
          "x2": 0.2,
          "y1": 0.6802326,
          "y2": 0.95348835
        },
        "imageURL": "ImageObj12"
      },
      {
        "box": {
          "x1": 0.79,
          "x2": 0.97,
          "y1": 0.67151165,
          "y2": 0.9447674
        },
        "imageURL": "ImageObj16"
      },
      {
        "box": {
          "x1": 0.594,
          "x2": 0.782,
          "y1": 0.6686047,
          "y2": 0.9476744
        },
        "imageURL": "ImageObj15"
      },
      {
        "box": {
          "x1": 0.786,
          "x2": 0.974,
          "y1": 0.3488372,
          "y2": 0.627907
        },
        "imageURL": "ImageObj11"
      },
      {
        "box": {
          "x1": 0.594,
          "x2": 0.782,
          "y1": 0.3488372,
          "y2": 0.627907
        },
        "imageURL": "ImageObj10"
      },
      {
        "box": {
          "x1": 0.406,
          "x2": 0.59,
          "y1": 0.3488372,
          "y2": 0.61918604
        },
        "imageURL": "ImageObj9"
      },
      {
        "box": {
          "x1": 0.206,
          "x2": 0.398,
          "y1": 0.34302327,
          "y2": 0.622093
        },
        "imageURL": "ImageObj8"
      },
      {
        "box": {
          "x1": 0.016,
          "x2": 0.2,
          "y1": 0.34302327,
          "y2": 0.61627907
        },
        "imageURL": "ImageObj7"
      },
      {
        "box": {
          "x1": 0.79,
          "x2": 0.97,
          "y1": 0.046511628,
          "y2": 0.3110465
        },
        "imageURL": "ImageObj6"
      },
      {
        "box": {
          "x1": 0.594,
          "x2": 0.782,
          "y1": 0.034883723,
          "y2": 0.31686047
        },
        "imageURL": "ImageObj5"
      },
      {
        "box": {
          "x1": 0.404,
          "x2": 0.588,
          "y1": 0.031976745,
          "y2": 0.30523255
        },
        "imageURL": "ImageObj4"
      },
      {
```

Figure 4:
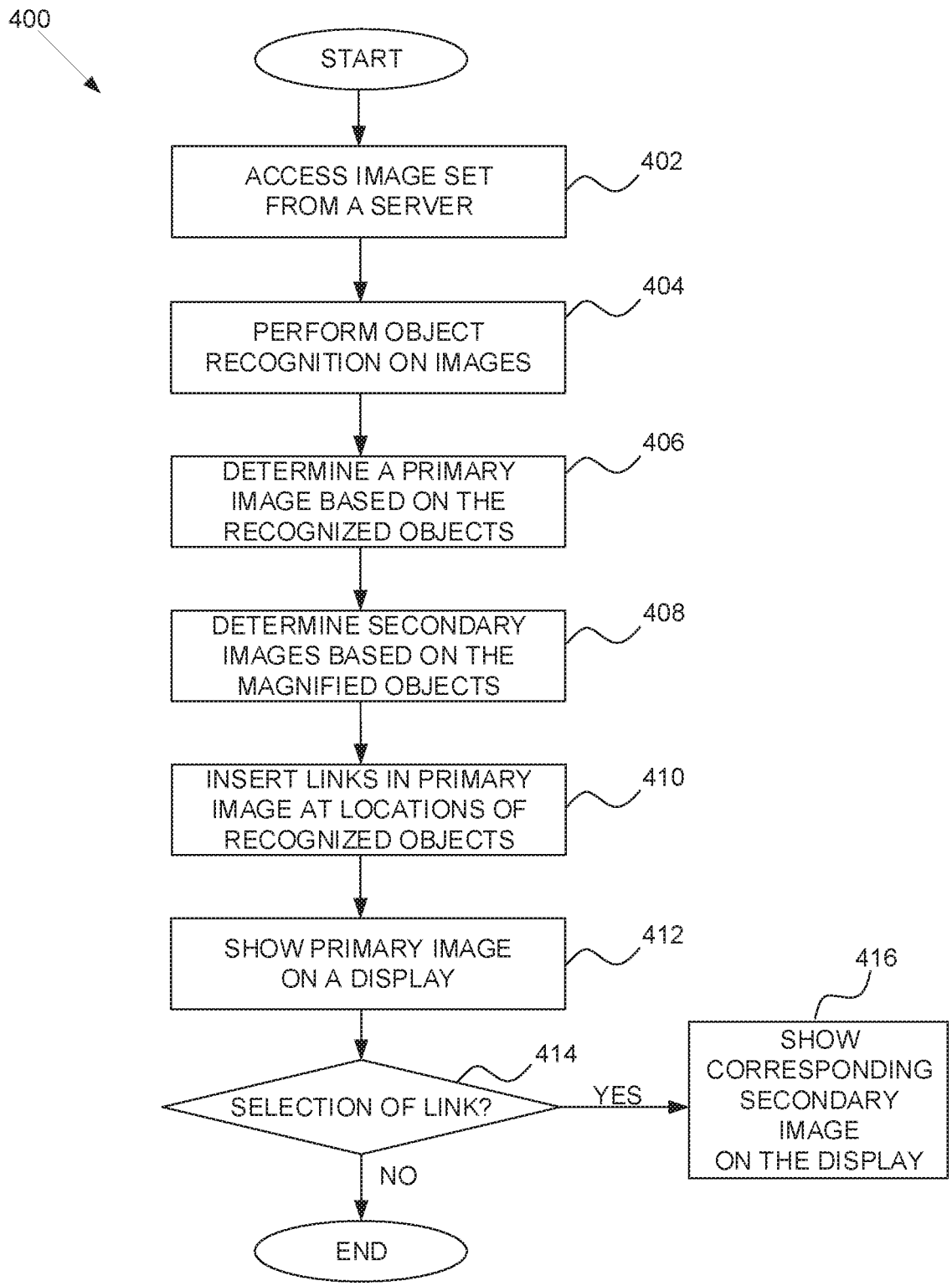
FIG. 4 is a flow diagram of an example high-level method for publishing a set of interrelated electronic images.

FIG. 4 is a flow diagram of an example high-level method 400 for publishing a set of interrelated electronic images.

Figure 8:
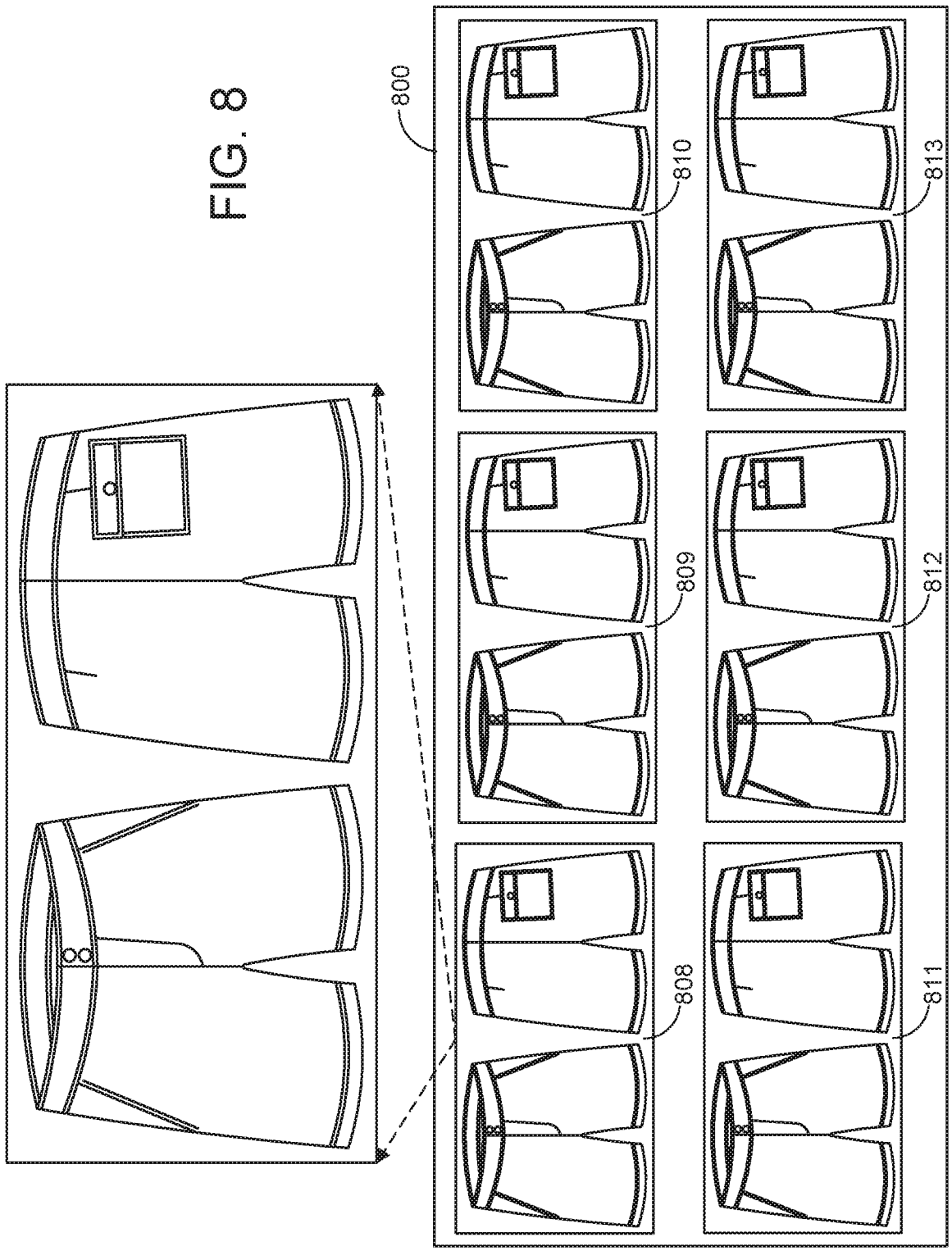
FIG. 8 is an example set of electronic images for publishing by determining interrelationships between the images.

The operation of method 400 will be described with respect to the elements of FIGS. 1-3 and with respect to FIG. 8 which shows an example set of electronic images 800-807 for publication, including determining interrelationships between the images 800-807 and linking them accordingly.

In operation 402, a set of images is accessed by image processing module 212 from a server (e.g., from an application server 118 or a connected database 126). In operation 404, the set of images 800-807 is analyzed by image processing module 212 to identify objects 808-813 in each image using object recognition algorithms. For example, based on information input by a user that uploads the images 800-807, it is determined that the images 800-807 include clothing objects (e.g., images of a pair of shorts that come in several different colors or in several different combinations of colors) and therefore a color contour matching object recognition algorithm is used to identify objects 808-813 in the images. In operation 406, image processing module 212 determines a primary image 800 of the set of images 800-807 based on image 800 including more recognized objects (e.g. 6 differently colored pairs of shorts 808-813 shown from front and back) than any of the other images 801-807 which each only show one pair of shorts (e.g., object 808) of one color or color combination) from magnified front and back views.

In operation 408, for each of the identified objects (e.g., each differently colored pairs of shorts 808-813) in the primary image 800, such as object 808, image processing module 212 determines a secondary image 801-807 of the set that: includes the identified object 808 and has a higher magnification than the primary image 800. In the example of FIG. 8, one of the secondary images 801-807, for example image 801, will show the pair of shorts of the same color (e.g., the identified object 808) an have a higher magnification than the primary image 800. In operation 410, image processing module 212 inserts zooming links into the primary image 800 at the locations in the primary image 800 that include an identified object, such as object 808, that is also in a secondary image (e.g., image 801). The links for zooming are not shown in the example primary image 800 since the visual display of the links for zooming into the identified objects 808-813 of primary image 800 may simply consist of highlighting each object 808-813 when a mouse pointer (or other pointer device such as a finger on a touch screen) is hovering over an identified object 808-813. In operation 412, image processing module 212 shows the primary image 800 on a display (e.g., of a client device 110 or 112), e.g., based on a viewer browsing a website that includes the set of images 800-807. In operation 414, image processing module 212 determines whether a selection of one of the zooming links (e.g., for object 808) is received from the viewer. In operation 416, based on determining that a selection of a link has been received, image processing module 212 shows, on the display of a client device 110 or 112, the corresponding secondary image (e.g., image 801) that includes the identified object 808 that appears at the location of the selected zooming link in primary image 800.

Figure 5:
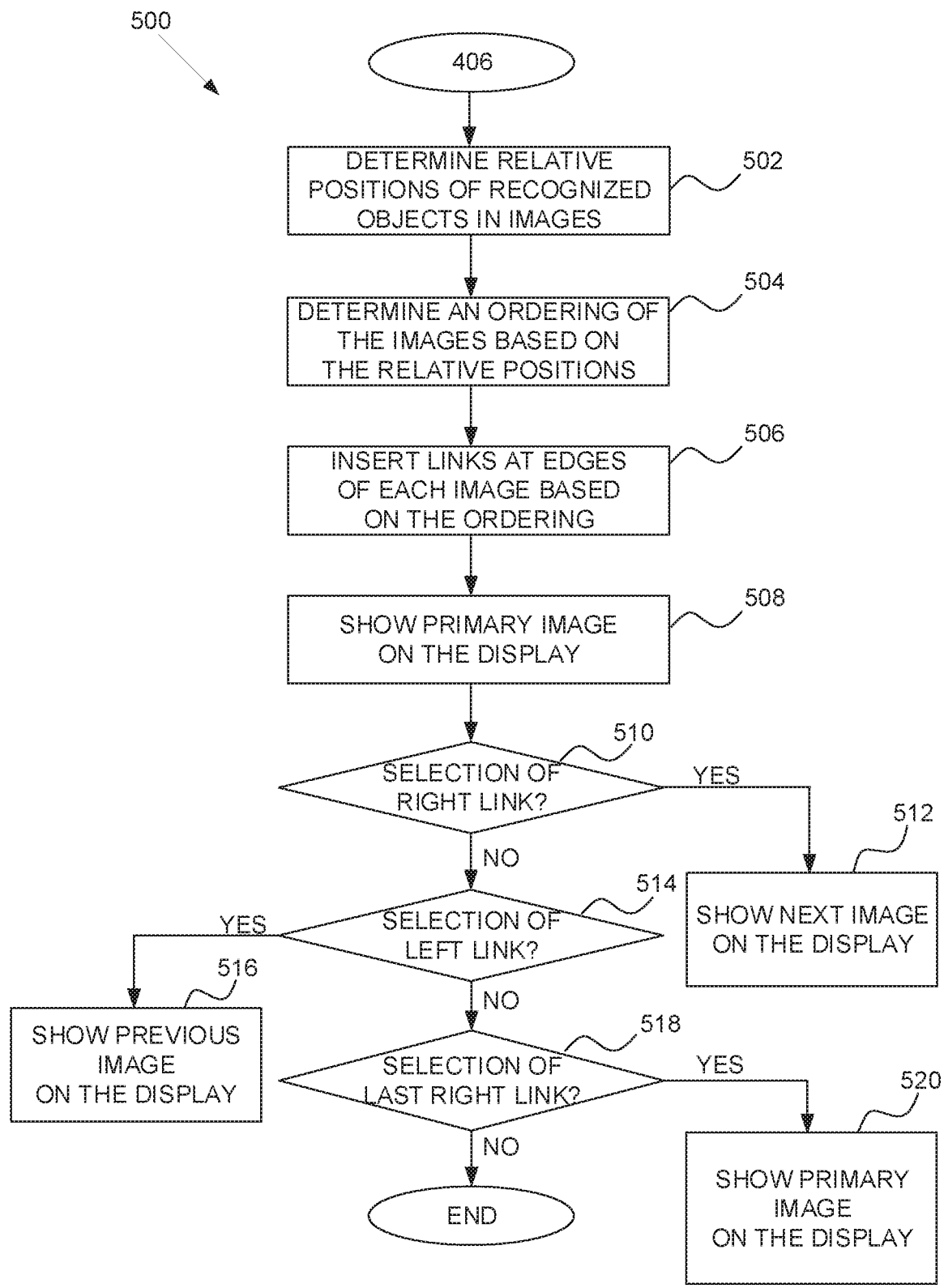
FIG. 5 is a flow diagram of an example high-level method for publishing a set of interrelated electronic images.

FIG. 5 is a flow diagram of an example high-level method 500 for publishing a set of interrelated electronic images. The operation of method 500 will be described with respect to the elements of FIGS. 1-3 and with respect to FIG. 9A which shows an example set of images A-D for publication, including determining interrelationships between the images A-D and linking them accordingly.

Figure 9A:
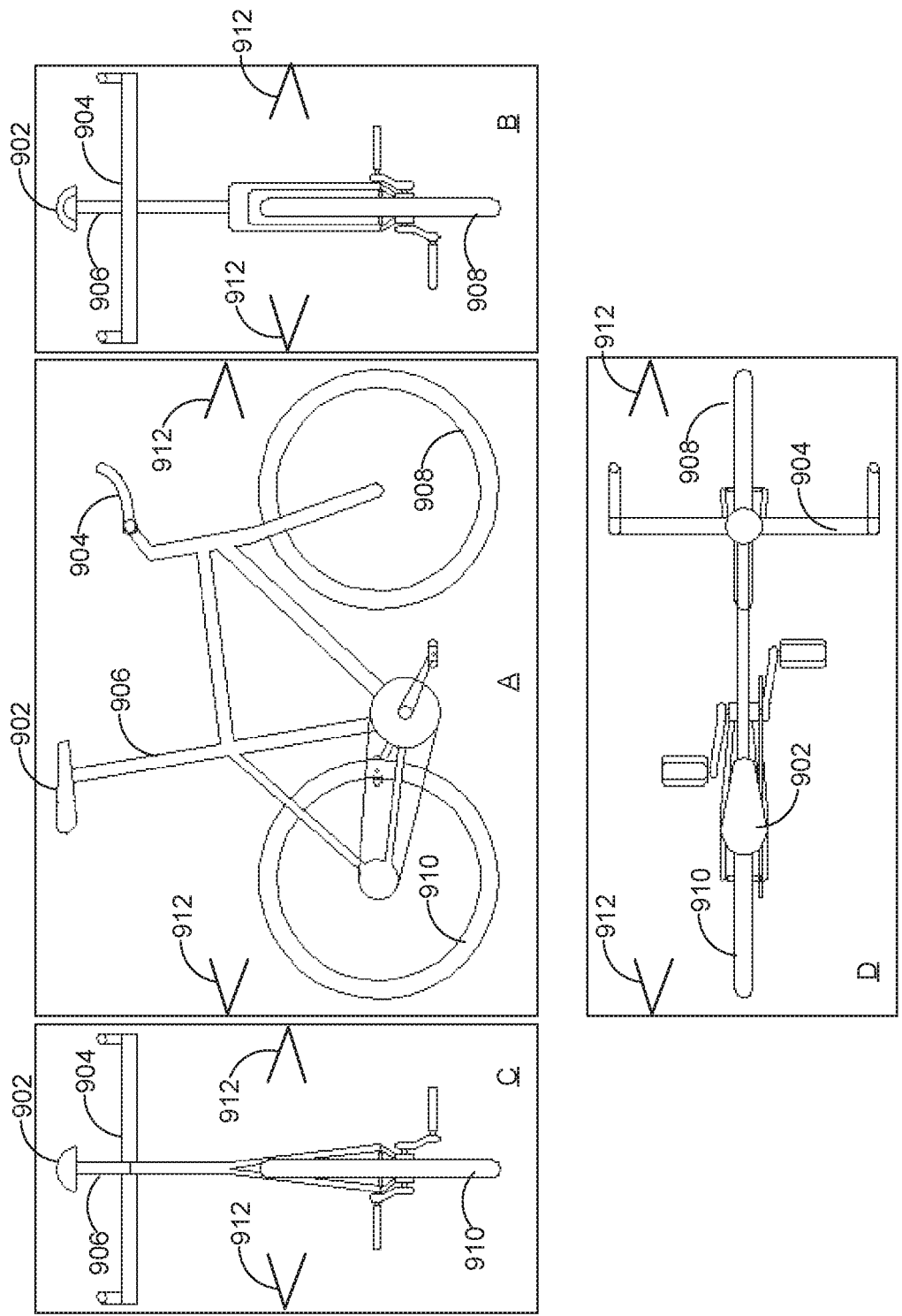
FIG. 9A is an example set of electronic images for publishing by determining interrelationships between the images.

In operation 502, which continues from operation 406 of FIG. 4, image processing module 212, for each of the identified objects 902-910 (e.g., identified using a template matching object recognition algorithm based on the associated product listing being for a bicycle) in the example set of images A-D, analyzes each image of the set of images A-D to determine the relative location of at least one identified object 902-910 in the image with respect to the location of the same at least one identified object 902-910 in each of the other images A-D. In the example of FIG. 9A the identified objects 902-910 were matched to templates for a bicycle seat (e.g., object 902), a bicycle handlebar (e.g., object 904), bicycle seat base bar (e.g., object 906), bicycle wheel (e.g., object 908) and another bicycle wheel (e.g., object 910). As noted above, with respect to operation 406 of FIG. 4, the primary image A for the set A-D is determined based on image A including the most (in this case all) of the identified objects 902-910 whereas each other image B-D includes less. For example, image B only includes 902-908, image C only includes 902-906 and 910, and image D only includes 902, 904, 908 and 910.

In operation 504, image processing module 212, based on the relative location of the at least one identified object in each image, determines an ordering of the images A-D of the set starting from the primary image A. In the example of FIG. 9A the relative position of the identified object 904 in images B and C indicates that object 904 is in front of identified object 906 in image B and object 904 is behind identified object 906 in image B. This positional information together with information regarding, for example, the shape of the identified object 902 in images A-C (e.g., based on the shape of 902 in the primary image A it is clear that image B shows the smaller front part of 902 and image C shows the larger back part) it can be determined that image B shows a front side view of the bicycle and image C shows a back side view of the bicycle. Furthermore, the shape of the identified object 902 in image D (e.g., based on the shape of 902 in the primary image A it is clear that image D shows the top part of 902) and the relative position of the identified object 904 in images D and A-C (that indicates that object 904 is below identified object 902 in images A-C but in the same plane as object 902 in image D) is used to determined that image D shows a top side view of the bicycle. Accordingly an enhanced image navigation experience can be provided by ordering the images A-D in a viewer friendly order starting with the primary image A so that the viewer can begin with the most comprehensive view of the bicycle (e.g., most identified objects) and continuing to the front (image B), back (image C) and top (image D) sides views of the bicycle in order to get a 360° view of the bicycle. It is noted that images 801-807 of FIG. 8 can also be ordered based on the location of the corresponding identified object (in each image 801-807) in the primary image 800 (e.g., object 808 for image 801), for example, by starting at upper left corner of primary image 800 (e.g., object 808) and progressing from left to right before moving down to the next row and starting again from identified object 811. In this way a viewer can traverse the images 801-807 without having to interact with primary image 800.

In operation 506, image processing module 212 inserts a traversal link 912 into each image of the set A-D at each of a right edge and a left edge of the image so that a viewer can traverse the set of images A-D in an orchestrated manner as follows. In operation 508, image processing module 212 shows the primary image A on the display of a client device 110 or 112. In operation 510, image processing module 212, for each of the images of the set A-D (e.g., starting with primary image A) determines if a selection of the traversal link at the right edge of the image has been received. In operation 512, image processing module 212 shows, on the display, the image that follows the current image in the ordering based on receiving a selection of the traversal link at the right edge of the image. In operation 514, image processing module 212, for each of the images of the set A-D (e.g., starting with primary image A) determines if a selection of the traversal link at the left edge of the image has been received. In operation 516, image processing module 212 shows, on the display, the image that precedes the current image in the ordering based on receiving a selection of the traversal link at the left edge of the image. In operation 518, image processing module 212, for the last image of the set A-D (e.g., image D) determines if a selection of the traversal link at the right edge of the image has been received. In operation 520, image processing module 212 shows, on the display, the primary image A based on receiving a selection of the traversal link at the right edge of the last image.

Figure 6:
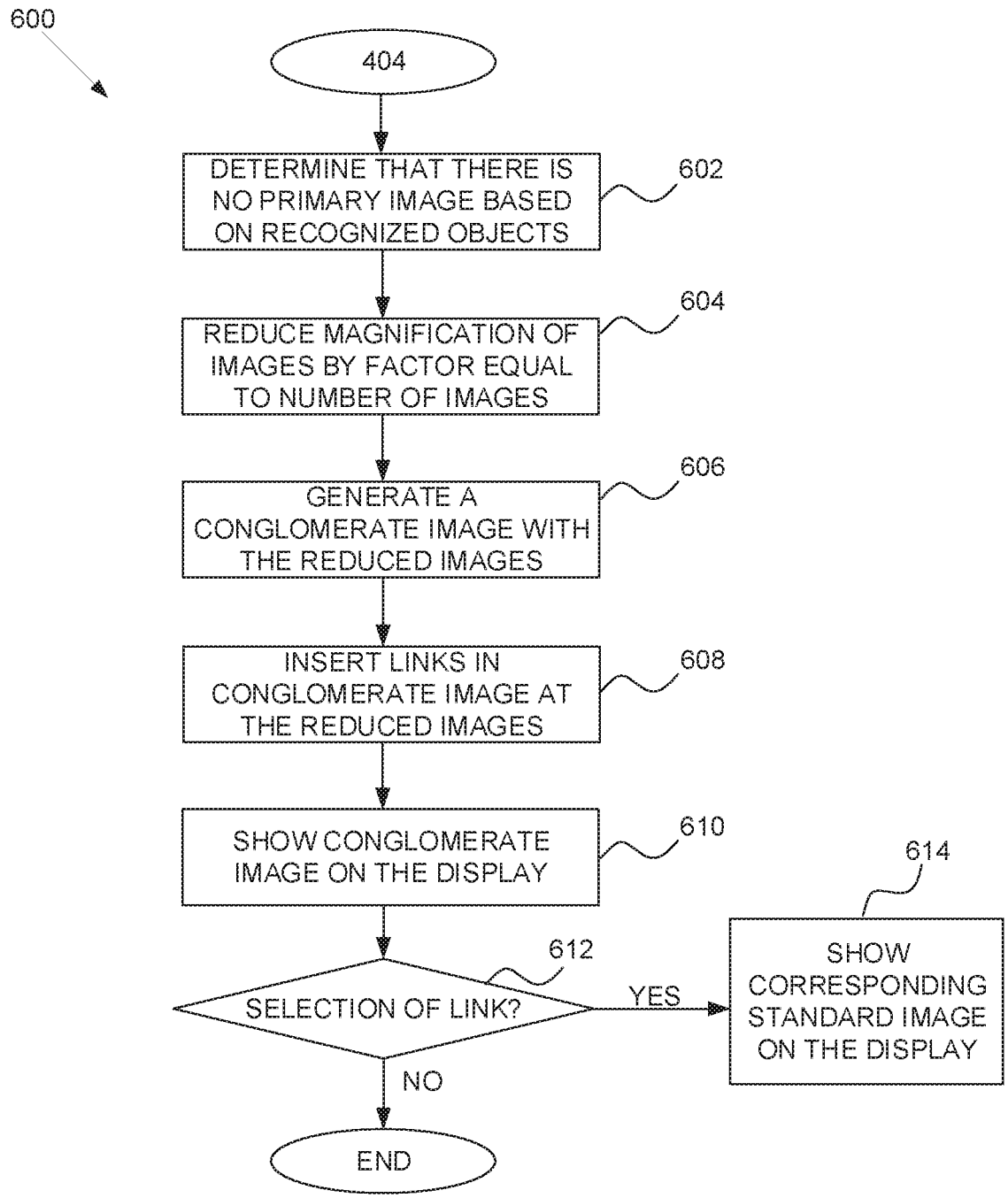
FIG. 6 is a flow diagram of an example high-level method for publishing a set of interrelated electronic images.

FIG. 6 is a flow diagram of an example high-level method 600 for publishing a set of interrelated electronic images. The operation of method 600 will be described with respect to the elements of FIGS. 1-3 and with respect to FIG. 8 which shows an example set of images 801-807 for publication, including determining interrelationships between the images 801-807 and linking them accordingly. For the purpose of describing method 600 it is assumed that image 800 has not been accessed by the image processing module 212.

In operation 602, which continues from operation 404 of FIG. 4, image processing module 212 determines that no image of the set of images 801-807 includes more of the identified objects than any of the other images of the set (e.g., they each include only one identified object 808-813) and all images 801-807 of the set are of equivalent size, which is the case in most product listings. In operation 604, image processing module 212 reduces the size of each of the images 801-807 of the set by a factor equal to the total number of images in the set which is 6. In operation 606, image processing module 212 generates a conglomerate primary image 800 by including each of the images 801-807 with reduced size in one image. The reduced sized images 801-807 may simply be placed side by side in sequential order so that the identified objects 808-813 in each of the images 801-807 line up like those in the primary image 800 of FIG. 8. In operation 608, image processing module 212 inserts zooming links into the conglomerated primary image 800 at the locations in the primary image 800 that include a reduced size image 801-807, such as image 801 including identified object 808 at the upper left hand corner of primary image 800. The links for zooming the reduced size images 801-807 are not shown in the example primary image 800 since the visual display of the links may simply consist of highlighting each of the reduced size images 801-807 when a mouse pointer (or other pointer device such as a finger on a touch screen) is hovering over an image. In operation 610, image processing module 212 shows the conglomerated primary image 800 on a display (e.g., of a client device 110 or 112) e.g., based on a viewer browsing a website that includes the set of images 801-807. In operation 612, image processing module 212 determines whether a selection of one of the zooming links (e.g., for reduced size image 801 including identified object 808) is received from the viewer. In operation 614, based on determining that a selection of a link has been received, image processing module 212 shows, on the display of a client device 110 or 112, the corresponding normal (e.g., not reduced) size image 801 that includes the identified object 808 that appears at the location of the selected zooming link in the conglomerated primary image 800.

Figure 7:
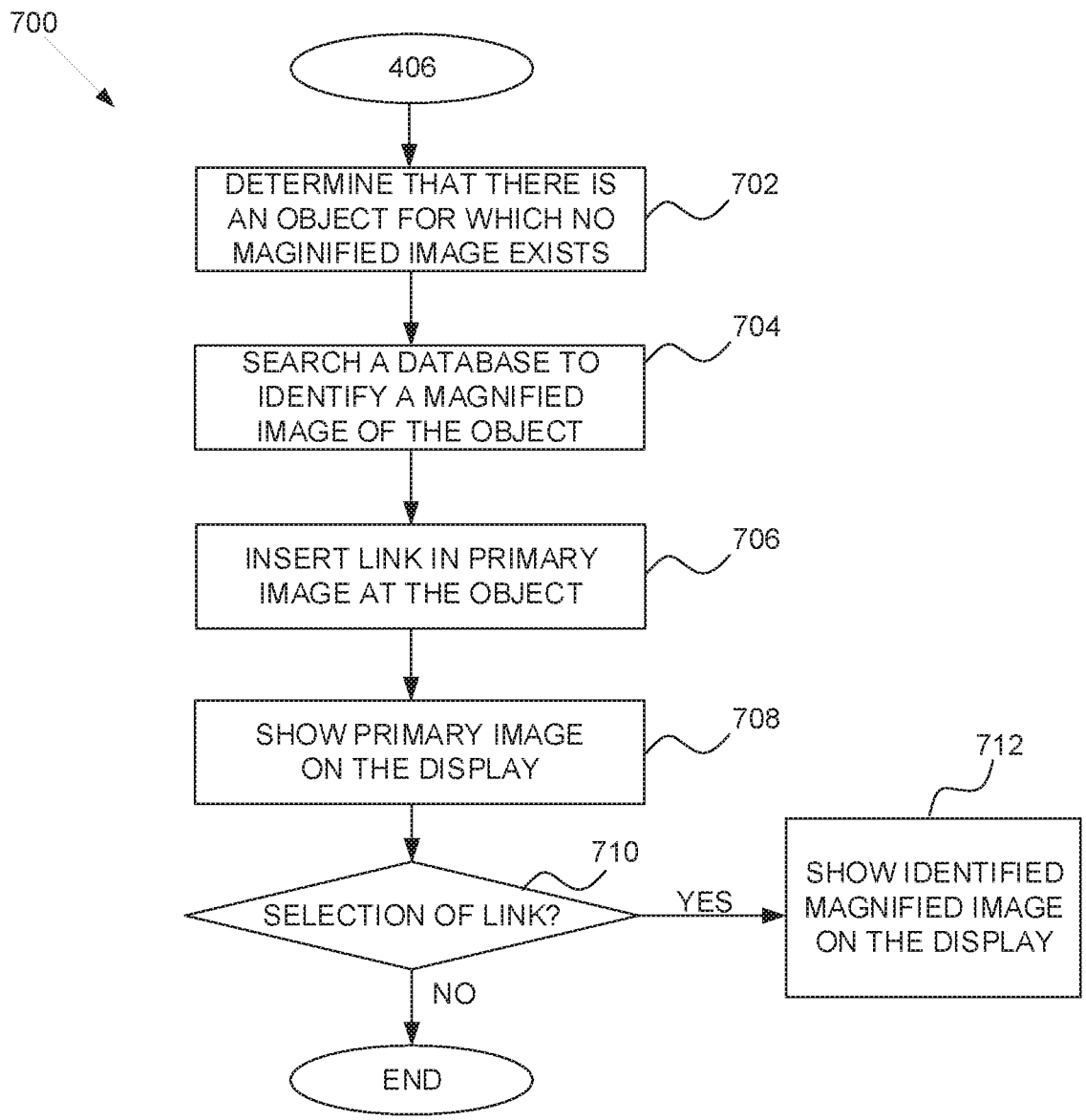
FIG. 7 is a flow diagram of an example high-level method for publishing a set of interrelated electronic images.
Figure 9B:
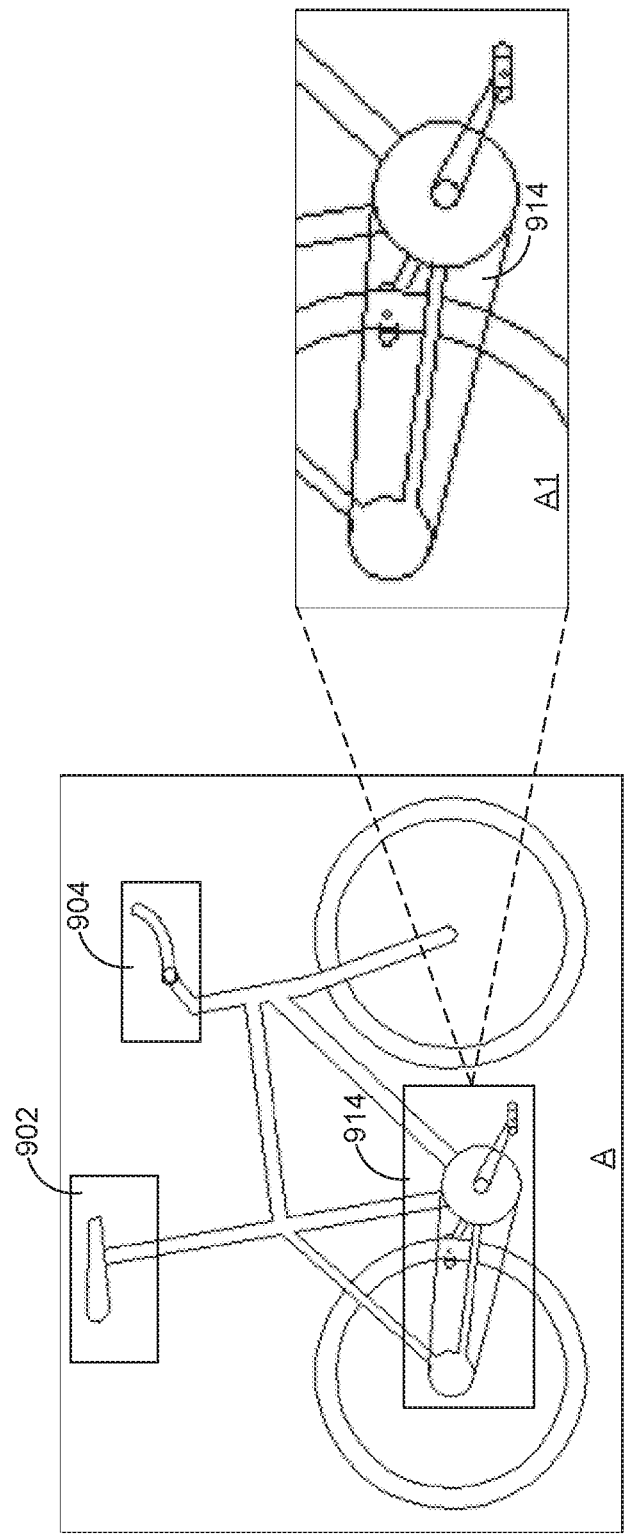
FIG. 9B is an example set of electronic images for publishing by determining interrelationships between the images.

FIG. 7 is a flow diagram of an example high-level method 700 for publishing a set of interrelated electronic images. The operation of method 700 will be described with respect to the elements of FIGS. 1-3 and with respect to FIGS. 9A and 9B which shows an example set of images A-D and A1 for publication, including determining interrelationships between the images A-D and A1 and linking them accordingly.

In operation 702, which continues from operation 406 of FIG. 4, image processing module 212 determines that no image of the set of images B-D, for at least one of the identified object 914 (e.g., bicycle chain and pedal assembly) in the primary image A, includes the identified object 914 and has a higher magnification than the primary image A. This is the case because, although images B-D include the identified object 914, these images are not of a higher magnification level than primary image A. In operation 704, image processing module 212 searches a database of stored images (e.g., a database 126) to identify a stored image A1 that: includes the identified object 914 and has a higher magnification than the primary image A. Furthermore, similar database searches can be performed for the other identified objects (e.g., 902, 904, etc.) recognized in primary image A, since none of the images B-D includes a higher magnification of these identified objects. As noted above the search may be based on object recognition performed on images in the database 126 or based on input form a user who provided the set of images A-D.

In operation 706, image processing module 212 inserts a zooming links into the primary image A at the location in the primary image A that includes the identified object 914 that is also in the searched image A1. Similar links can be inserted for identified objects 902 or 904 (or others), based on similar searched for higher magnification images of these identified objects. The link for zooming the identified object 914 is not shown in the example primary image A since the visual display of the link may simply consist of highlighting the identified object 914 when a mouse pointer (or other pointer device such as a finger on a touch screen) is hovering over the identified object 914. In operation 708, image processing module 212 shows the primary image A on a display (e.g., of a client device 110 or 112), e.g., based on a viewer browsing a website that includes the set of images A-D. In operation 710, image processing module 212 determines whether a selection of the zooming link for identified object 914 is received from the viewer. In operation 712, based on determining that a selection of the link has been received, image processing module 212 shows, on the display of a client device 110 or 112, the image A1 that includes a magnified view of the identified object 914 that appears at the location of the selected zooming link in the primary image A.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors)

may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-9 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the subject matter in different contexts from the disclosure contained herein.

Software Architecture

Figure 10:
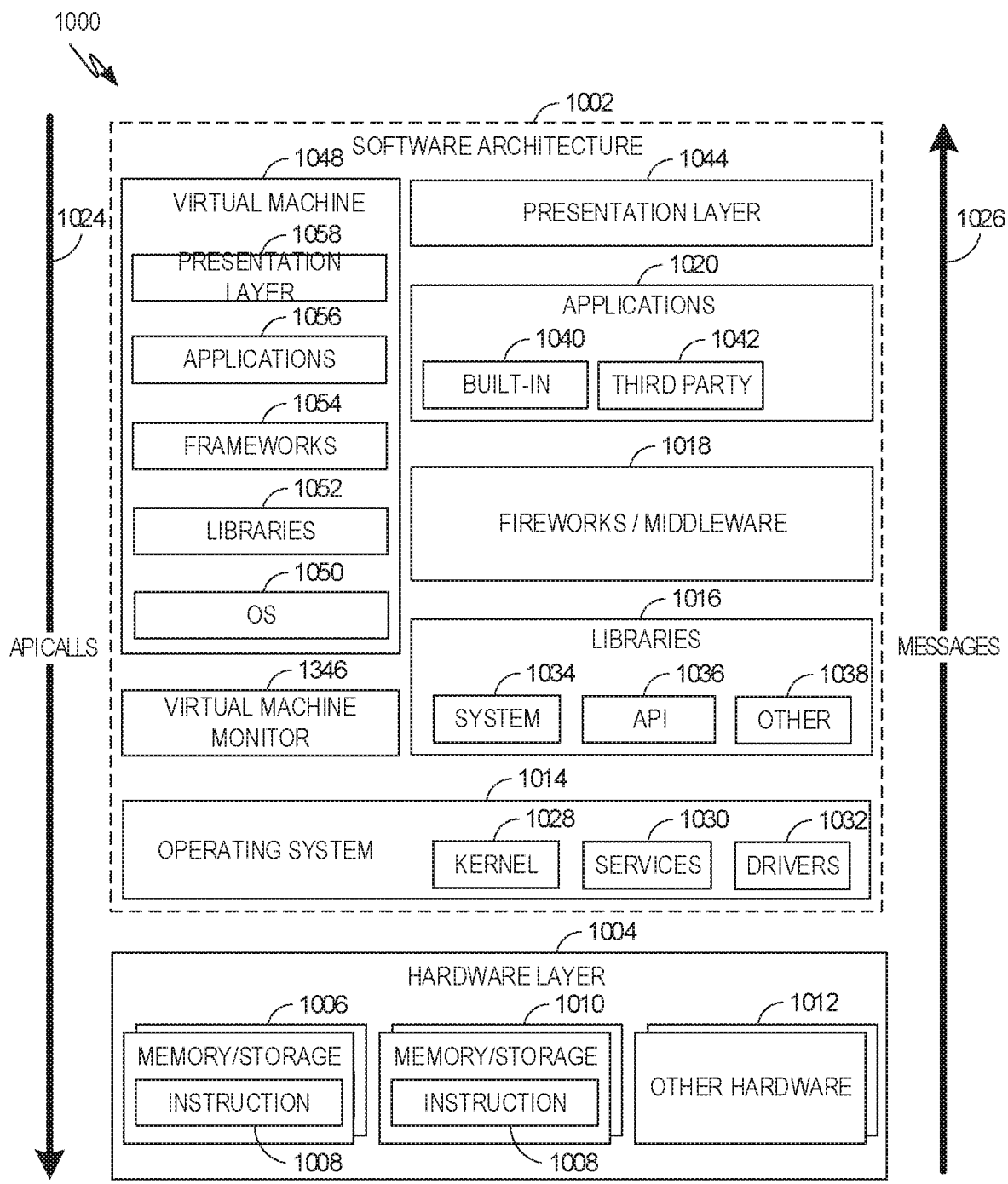
FIG. 10 is a block diagram illustrating an example of a software architecture that may be installed on a machine, according to some example embodiments.

FIG. 10 is a block diagram illustrating an example of a software architecture that may be installed on a machine, according to some example embodiments. FIG. 10 is merely a non-limiting example of a software architecture, and it will be appreciated that many other architectures may be implemented to facilitate the functionality described herein. The software architecture 1002 may be executing on hardware such as a machine 1100 of FIG. 11 that includes, among other things, processors 1110, memory 1130, and I/O components 1150. A representative hardware layer 1004 is illustrated and can represent, for example, the machine 1100 of FIG. 11. The representative hardware layer 1004 comprises one or more processing units 1006 having associated executable instructions 1008. The executable instructions 1008 represent the executable instructions of the software architecture 1002, including implementation of the methods, modules, and so forth of FIGS. 1-9. The hardware layer 1004 also includes memory or storage modules 1010, which also have the executable instructions 1008. The hardware layer 1004 may also comprise other hardware 1012, which represents any other hardware of the hardware layer 1004, such as the other hardware illustrated as part of the machine 1000.

In the example architecture of FIG. 10, the software architecture 1002 may be conceptualized as a stack of layers, where each layer provides particular functionality. For example, the software architecture 1002 may include layers such as an operating system 1014, libraries 1016, frameworks/middleware 1018, applications 1020, and a presentation layer 1044. Operationally, the applications 1020 or other components within the layers may invoke API calls 1024 through the software stack and receive a response, returned values, and so forth (illustrated as messages 1026) in response to the API calls 1024. The layers illustrated are representative in nature, and not all software architectures have all layers. For example, some mobile or special purpose operating systems may not provide a frameworks/middleware 1018 layer, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1016 may provide a common infrastructure that may be utilized by the applications 1020 and/or other components and/or layers. The libraries 1016 typically provide functionality that allows other software modules to perform tasks in an easier fashion than by interfacing directly with the underlying operating system 1014 functionality (e.g., kernel 1028, services 1030, or drivers 1032). The libraries 1016 may include system 1034 libraries (e.g., C standard library) that may provide functions such as memory allocation functions, string manipulation functions, mathematic functions, and the like. In addition, the libraries 1016 may include API 1036 libraries such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The frameworks 1018 (also sometimes referred to as middleware) may provide a higher-level common infrastructure that may be utilized by the applications 1020 or other software components/modules. For example, the frameworks 1018 may provide various graphic user interface (GUI) functions, high-level resource management, high-level location services, and so forth. The frameworks 1018 may provide a broad spectrum of other APIs that may be utilized by the applications 1020 and/or other software components/modules, some of which may be specific to a particular operating system or platform.

The applications 1020 include built-in applications 1040 and/or third party applications 1042. Examples of representative built-in applications 1040 may include, but are not limited to, a contacts application, a browser application, a book reader application, a location application, a media application, a messaging application, or a game application. The third party applications 1042 may include any of the built-in applications, as well as a broad assortment of other applications. In a specific example, the third party application 1042 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1042 may invoke the API calls 1024 provided by the mobile operating system such as the operating system 1014 to facilitate functionality described herein.

The applications 1020 may utilize built-in operating system functions (e.g., kernel 1028, services 1030, or drivers 1032), libraries (e.g., system 1034, APIs 1036, and other libraries 1038), or frameworks/middleware 1018 to create user interfaces to interact with users of the system. Alternatively, or additionally, in some systems, interactions with a user may occur through a presentation layer, such as the presentation layer 1044. In these systems, the application/module "logic" can be separated from the aspects of the application/module that interact with the user.

Some software architectures utilize virtual machines. In the example of FIG. 10, this is illustrated by a virtual machine 1048. A virtual machine creates a software environment where applications/modules can execute as if they were executing on a hardware machine e.g., the machine 1100 of FIG. 11, for example). A virtual machine is hosted by a host operating system (e.g., operating system 1014) and typically, although not always, has a virtual machine monitor 1046, which manages the operation of the virtual machine as well as the interface with the host operating system (e.g., operating system 1014). A software architecture executes within the virtual machine 1048, such as an operating system 1050, libraries 1052, frameworks/middleware 1054, applications 1056, or a presentation layer 1058. These layers of software architecture executing within the virtual machine 1048 can be the same as corresponding layers previously described or may be different.

Example Machine Architecture and Machine-Readable Medium

Figure 11:
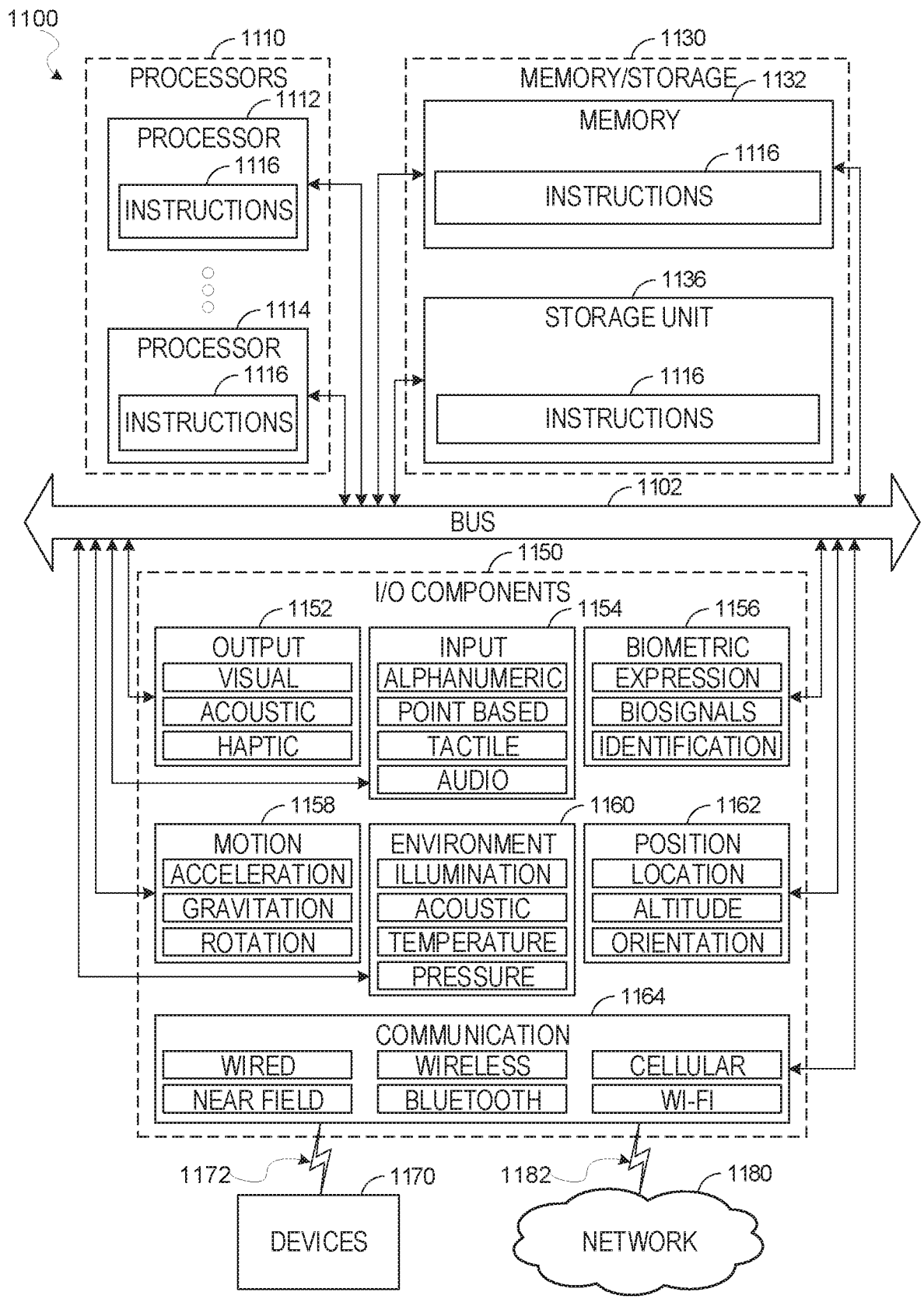
FIG. 11 illustrates a diagrammatic representation of a machine in the form of a computer system within which a set of instructions may be executed for causing the machine to perform any one or more of the methodologies discussed herein, according to an example embodiment.

FIG. 11 illustrates a diagrammatic representation of a machine in the form of a computer system within which a set of instructions may be executed for causing the machine to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example the instructions 1116 may cause the machine 1100 to execute the method 400 of FIG. 4. Additionally, or alternatively, the instructions 1116 may implement FIGS. 1-9, and so forth. The instructions 1116 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and I/O components 1150, which may be configured to communicate with each other such as via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1112 and a processor 1114 that may execute the instructions 1116. The term "processor" is intended to include multi-core processors that may comprise two or more independent processors (sometimes referred to as "cores") that may execute instructions contemporaneously. Although FIG. 11 shows multiple processors, the machine 1100 may include a single processor with a single core, a single processor with multiple cores (e.g., a multi-core processor), multiple processors with a single core, multiple processors with multiples cores, or any combination thereof.

The memory/storage 1130 may include a memory 1132, such as a main memory, or other memory storage, and a storage unit 1136, both accessible to the processors 1110 such as via the bus 1102. The storage unit 1136 and the memory 1132 store the instructions 1116 embodying any one or more of the methodologies or functions described herein. The instructions 1116 may also reside, completely or partially, within the memory 1132, within the storage unit 1136, within at least one of the processors 1110 (e.g., within the processor's cache memory), or any suitable combination thereof, during execution thereof by the machine 1100. Accordingly, the memory 1132, the storage unit 1136, and the memory of the processors 1110 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), or any suitable combination thereof. The term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine (e.g., processors 1110), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162, among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1162 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a USB).

Moreover, the communication components 1164 may detect identifiers or include components operable to detect identifiers. For example, the communication components 1164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1180 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A system comprising:
hardware processing circuitry; and
one or more hardware memories storing instructions that when executed configure the hardware processing circuitry to perform operations comprising:
evaluating a plurality of images to identify a plurality of objects, wherein at least a first image of the plurality of images includes more than one object of the plurality of objects;
based on the evaluation, determining that the first image of the plurality of images includes a greatest quantity of objects of the plurality of objects;
determining that at least a second image of the plurality of images includes a first view of an object of the greatest quantity of objects in the first image;
determining that at least a third image of the plurality of images includes a second view of the object of the greatest quantity of objects in the first image;
associating a first link with the object of the greatest quantity of objects in the first image, wherein the first link is directed to the second image;
associating a second link with the first view of the object in the second image, wherein the second link is directed to the third image;
determining a location of the object in the second image relative to a location of the object in the third image;
determining a display order of the plurality of images based on the first image including the greatest quantity of objects and the location of the object in the second image relative to the location of the object in the third image, the display order indicating that the second image is to follow the first image, and that the third image is to follow the second image;
associating the first link with the first image and the second link with the second image based on the display order;
receiving input indicating a selection of the first link in the first image; and
causing the second image including the first view of the object to be displayed in response to the selection.

2. The system of claim 1, the operations further comprising:
in response to determining the second view of the object of the greatest quantity of objects is more detailed than the first view of the object of the greatest quantity of objects, associating the second link to the third image with the object in the first image.

3. The system of claim 2, wherein the second link is associated with a location of the object of the greatest quantity of objects in the first image.

4. The system of claim 2, the operations further comprising iteratively evaluating the plurality of images to identify one or more views of each object of the greatest quantity of objects, and associating a link with each identified object of the greatest quantity of objects in the first image, each having a respective first representation in the first image.

5. The system of claim 1, the operations further comprising:
determining a category of the first image, and
selecting an object recognition algorithm to apply to the first image to identify the object based on the category.

6. The system of claim 5, wherein the determining the category comprises determining a category of a product listing on an ecommerce website that includes the first image.

7. The system of claim 1, the operations further comprising:
evaluating a second plurality of images to identify a second plurality of objects, wherein each of the second plurality of images includes at least one object of the second plurality of objects;
based on evaluating the second plurality of images, determining that no image of the second plurality of images includes a greatest quantity of objects of the second plurality of objects and that all images of the second plurality of images are of equivalent size;
in response to determining that no image of the second plurality of images includes the greatest quantity of objects of the second plurality of objects, reducing a size of each of the images of the second plurality of images by a factor equal to a total number of images in the second plurality of images;
generating a conglomerate image by including each of the images with reduced size into the conglomerate image;
associating links with the conglomerate image at locations in the conglomerate image corresponding to each of the reduced size images, wherein each link is directed to its corresponding image in the second plurality of images; and
causing display of the conglomerate image.

8. The system of claim 1, the operations further comprising receiving input associated with the first link, and displaying the second image of the plurality of images in a reduced size at a location of the selected first link in the first image.

9. The system of claim 1, the operations further comprising:
failing to identify any image in the plurality of images including a view of a particular object of the greatest quantity of objects in the first image;
in response to searching a database of stored images, inserting a third link at a location corresponding to the particular object in the first image, wherein the third link is directed to a stored image including a view of the particular object;
receiving input selecting the third link; and
responsive to the input, causing display of the stored image.

10. The system of claim 1, the operations further comprising:
determining a relative location of the object in the first image of the plurality of images with respect to a location of the object in at least the second image and the third image of the plurality of images;
based on the relative locations of the object, determining an ordering of at least the second image and the third image of the plurality of images; and
based on the ordering, associating a traversal link at each of a right edge and a left edge of the second image and the third image of the plurality of images, wherein selection of the traversal link at the right edge of an image causes a subsequent image to be displayed, wherein selection of the traversal link at the left edge of an image causes a preceding image to be displayed, and wherein selection of the traversal link at the right edge of a last image causes display of the first image.

11. A method, comprising:

evaluating, by hardware processing circuitry, a plurality of images to identify a plurality of objects, wherein at least a first image of the plurality of images includes more than one object of the plurality of objects;

based on the evaluation, determining that a first image of the plurality of images includes a greatest quantity objects of the plurality of objects;

determining that at least a second image of the plurality of images includes a first view of an object of the greatest quantity of objects in the first image;

determining that at least a third image of the plurality of images includes a second view of the object of the greatest quantity of objects in the first image;

associating a first link with the object of the greatest quantity of objects in the first image, wherein the first link is directed to the second image;

associating a second link with the first view of the object in the second image, wherein the second link is directed to the third image;

determining, by the hardware processing circuitry, a location of the object in the second image relative to a location of the object in the third image;

determining a display order of the plurality of images based on the first image including the greatest quantity of objects and the location of the object in the second image relative to the location of the object in the third image, the display order indicating that the second image is to follow the first image, and that the third image is to follow the second image;

associating the first link with the first image and the second link with the second image;

receiving input indicating a selection of the first link in the first image; and causing the second image including the first view of the object to be displayed in response to the selection.

12. The method of claim 11, further comprising:

in response to determining the second view of the object of the greatest quantity of objects is more detailed than the first view of the object of the greatest quantity of objects, associating the second link to the third image with the object in the first image.

13. The method of claim 11, further comprising:

determining a category of the first image, and selecting an object recognition algorithm to apply to the first image to identify the object based on the category.

14. The method of claim 13, wherein the determining the category comprises determining a category of a product listing on an ecommerce website that includes the first image.

15. The method of claim 11, further comprising:

evaluating a second plurality of images to identify a second plurality of objects, wherein each of the second plurality of images includes at least one object of the second plurality of objects;

based on evaluating the second plurality of images, determining that no image of the second plurality of images includes a greatest quantity of objects of the second plurality of objects and that all images of the second plurality of images are of equivalent size;

in response to determining that no image of the second plurality of images includes the greatest quantity of objects of the second plurality of objects, reducing a size of each of the images of the second plurality of images by a factor equal to a total number of images in the second plurality of images;

generating a conglomerate image by including each of the images with reduced size into the conglomerate image;

associating links with the conglomerate image at locations in the conglomerate image corresponding to each of the reduced size images, wherein each link is directed to its corresponding image in the second plurality of images;

causing display of the conglomerate image;

receiving input selecting one of the associated links, and displaying an image of the second plurality of images in a reduced size at a location of the selected link.

16. The method of claim 11, further comprising:

failing to identify any image in the plurality of images including a view of a particular object of the greatest quantity of objects in the first image;

in response to searching a database of stored images, inserting a third link at a location corresponding to the particular object in the first image, wherein the third link is directed to a stored image including a view of the particular object;

receiving input selecting the third link; and responsive to the input, causing display of the stored image.

17. The method of claim 11, further comprising:

determining a relative location the object in the first image of the plurality of images with respect to a location of the object in at least the second image and the third image of the plurality of images;

based on the relative locations of the object, determining an ordering of at least the second image and the third image of the plurality of images;

based on the ordering, associating a traversal link at each of a right edge and a left edge of the second image and the third image of the plurality of images, wherein selection of the traversal link at the right edge of an image causes a subsequent image to be displayed, wherein selection of the traversal link at the left edge of an image causes a preceding image to be displayed, and wherein selection of the traversal link at the right edge of a last image causes display of the first image.

18. A non-transitory computer readable storage medium comprising instructions that when executed configure hardware processing circuitry to perform operations comprising:

evaluating a plurality of images to identify a plurality of objects, wherein at least a first image of the plurality of images includes more than one object of the plurality of objects;

based on the evaluation, determining that a first image of the plurality of images includes a greatest quantity of objects of the plurality of objects;

determining that at least a second image of the plurality of images includes a first view of an object of the greatest quantity of objects in the first image;

determining that at least a third image of the plurality of images includes a second view of the object of the greatest quantity of objects in the first image;

associating a first link with the object of the greatest quantity of objects in the first image, wherein the first link is directed to the second image;

associating a second link with the first view of the object in the second image, wherein the second link is directed to the third image;

determining a location of the object in the second image relative to a location of the object in the third image;

determining a display order of the plurality of images based on the first image including the greatest quantity of objects and the location of the object in the second image relative to the location of the object in the third image, the display order indicating that the second image is to follow the first image, and that the third image is to follow the second image;

associating the first link with the first image and the second link with the second image;

receiving input indicating a selection of the first link in the first image; and causing the second image including the first view of the object to be displayed in response to the selection.

\* \* \* \* \*